United States Patent
Sahin et al.

(10) Patent No.: US 12,132,592 B2
(45) Date of Patent: Oct. 29, 2024

(54) LOW PAPR DMRS AND LOW INTER-CELL INTERFERENCE FOR DFT-SPREAD OFDM

(71) Applicant: INTERDIGITAL PATENT HOLDINGS, INC., Wilmington, DE (US)

(72) Inventors: Alphan Sahin, Westbury, NY (US); Moon-il Lee, Melville, NY (US); Rui Yang, Greenlawn, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 519 days.

(21) Appl. No.: 17/419,322

(22) PCT Filed: Dec. 31, 2019

(86) PCT No.: PCT/US2019/069101
§ 371 (c)(1),
(2) Date: Jun. 29, 2021

(87) PCT Pub. No.: WO2020/142513
PCT Pub. Date: Jul. 9, 2020

(65) Prior Publication Data
US 2022/0094583 A1 Mar. 24, 2022

Related U.S. Application Data

(60) Provisional application No. 62/793,827, filed on Jan. 17, 2019, provisional application No. 62/792,227, (Continued)

(51) Int. Cl.
*H04L 5/00* (2006.01)
*H04J 13/14* (2011.01)
*H04L 27/26* (2006.01)

(52) U.S. Cl.
CPC .......... *H04L 27/2613* (2013.01); *H04J 13/14* (2013.01); *H04L 27/262* (2013.01)

(58) Field of Classification Search
CPC ..... H04J 13/14; H04L 27/2613; H04L 27/262
See application file for complete search history.

(56) References Cited

U.S. PATENT DOCUMENTS 7,848,448 B2 12/2010 Han et al.
2018/0309552 A1* 10/2018 Akkarakaran ........ H04L 5/0051
(Continued)

FOREIGN PATENT DOCUMENTS

WO 2018064306 A1 4/2018

OTHER PUBLICATIONS

Huawei et al., "Sequence design for Pi/2-BPSK DFT-S-OFDM," 3GPP TSG RAN WG1 Meeting #95, R1-1814086, Spokane, USA (Nov. 12-16, 2018).
(Continued)

*Primary Examiner* — Phuc H Tran
(74) *Attorney, Agent, or Firm* — Volpe Koenig

(57) ABSTRACT

A WTRU may comprise circuitry configured to determine DMRS sequences of length 12, 18 and 24 for PI/2 BPSK DFT-s-OFDM modulation. The sequences are optimized for PAPR, CM, frequency flatness, cross-correlation and for channel estimation (cyclic correlation).

16 Claims, 8 Drawing Sheets

Related U.S. Application Data filed on Jan. 14, 2019, provisional application No. 62/787,647, filed on Jan. 2, 2019.

(56) References Cited

U.S. PATENT DOCUMENTS

| | | | | |
|---|---|---|---|---|
| 2020/0008164 | A1* | 1/2020 | Ko | H04J 11/00 |
| 2020/0266947 | A1* | 8/2020 | Noh | H04B 7/0456 |
| 2021/0168574 | A1* | 6/2021 | Zhang | H04W 8/005 |
| 2021/0243777 | A1* | 8/2021 | Tsai | H04W 74/006 |
| 2022/0038319 | A1* | 2/2022 | Kuchi | H04L 27/2613 |

OTHER PUBLICATIONS

Intel Corporation, "Low PAPR Reference Signals," 3GPP TSG RAN WG1 Meeting #95, R1-1813892, Spokane, USA (Nov. 12-16, 2018).

Mediatek Inc., "Low PAPR RS," 3GPP TSG RAN WG1 Ad-Hoc Meeting 1901, R1-1900220, Taipei, Taiwan (Jan. 21-25, 2019).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital, Inc., "On Low PAPR RS," 3GPP TSG RAN WG1 #96, R1-1902617, Athens, Greece (Feb. 25-Mar. 1, 2019).

Interdigital, Inc., "On Low PAPR RS," 3GPP TSG RAN WG1 Ad-Hoc Meeting 1901, R1-1900811, Taipei, Taiwan (Jan. 21-25, 2019).

Qualcomm et al., "Joint proposal on Length-12, length-18, and length-24 CG sequences for pi/2 BPSK," 3GPP TSG RAN WG1 Meeting #95, R1-1814205, Spokane, WA, USA (Nov. 12-16, 2018).

Qualcomm Incorporated, "Lower PAPR reference signals," 3GPP TSG RAN WG1 Meeting #95, R1-1813445, Spokane, WA, USA (Nov. 12-16, 2018).

Third Generation Partnership Project, "Technical Specification Group Radio Access Network; NR; Physical channels and modulation (Release 15)," 3GPP TS 38.211 V15.3.0 (Sep. 2018).

Third Generation Partnership Project, "Technical Specification Group Radio Access Network; NR; Physical channels and modulation (Release 15)," 3GPP TS 38.211 V15.7.0 (Sep. 2019).

Third Generation Partnership Project, "Technical Specification Group Radio Access Network; NR; Physical channels and modulation (Release 15)," 3GPP TS 38.211 V15.1.0 (Mar. 2018).

Ericsson, "Feature lead summary #3 of low PAPR RS," 3GPP TSG RAN WG1 Meeting #95, R1-1814109, Spokane, US (Nov. 12-16, 2018).

Qualcomm et al., "Joint proposal on length-12, length-18, and length-24 CG sequences for pi/2 BPSK," R1-1901362 (Jan. 22, 2019).

\* cited by examiner

LOW PAPR DMRS AND LOW INTER-CELL INTERFERENCE FOR DFT-SPREAD OFDM

CROSS REFERENCE TO RELATED APPLICATIONS

This application is the U.S. National Stage, under 35 U.S.C. § 371, of International Application No. PCT/US2019/069101, filed Dec. 31, 2019, which claims the benefit of U.S. Provisional Application Ser. No. 62/787,647, filed on Jan. 2, 2019, U.S. Provisional Application Ser. No. 62/792,227, filed on Jan. 14, 2019, and U.S. Provisional Application Ser. No. 62/793,827, filed Jan. 17, 2019, the contents of each of which are hereby incorporated by reference herein.

SUMMARY

A wireless transmit/receive unit (WTRU) may comprise circuitry configured to determine a sequence, from a set of sequences comprising 0 0 0 0 0 0 1 1 0 1 1 0, 0 0 0 0 0 1 0 0 0 1 1 1 and 0 0 0 0 0 1 1 1 0 1 1 1. The WTRU may further comprise a transmitter configured to transmit a demodulation reference signal (DMRS), derived from the determined sequence.

BRIEF DESCRIPTION OF THE DRAWINGS

Furthermore, like reference numerals in the figures indicate like elements, and wherein.

EXAMPLE NETWORKS FOR IMPLEMENTATION OF THE EMBODIMENTS

Figure 1A:
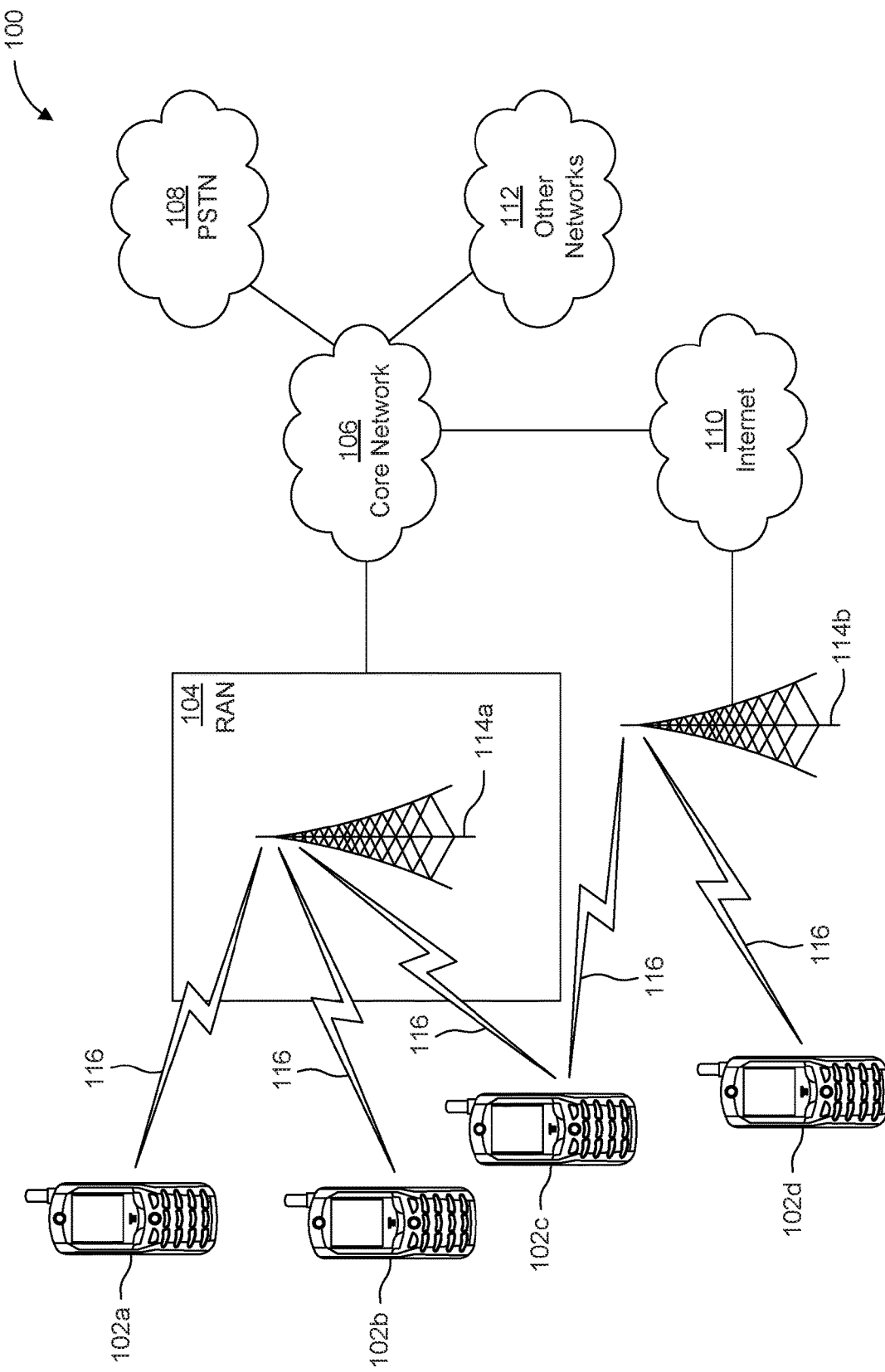
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
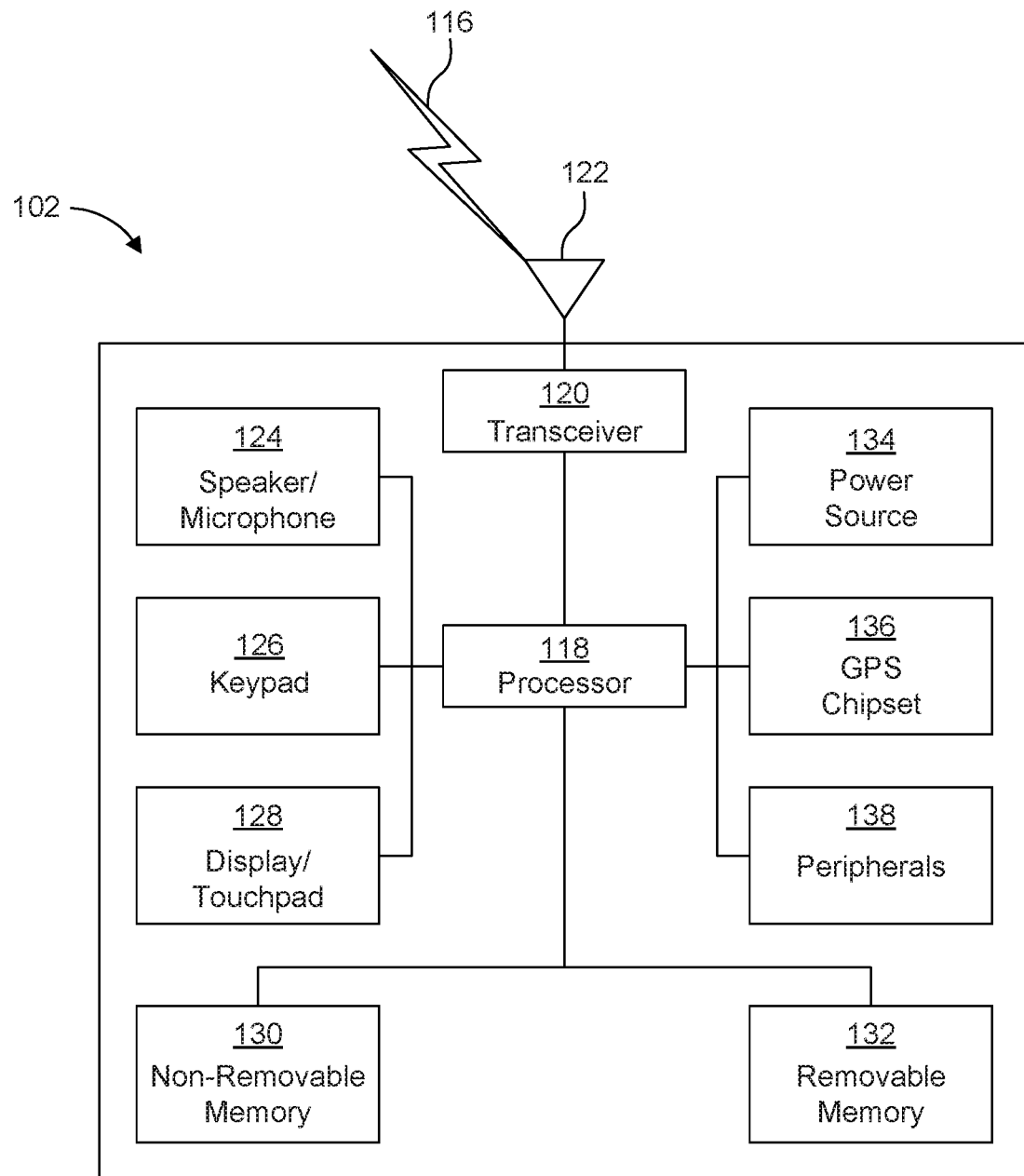
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
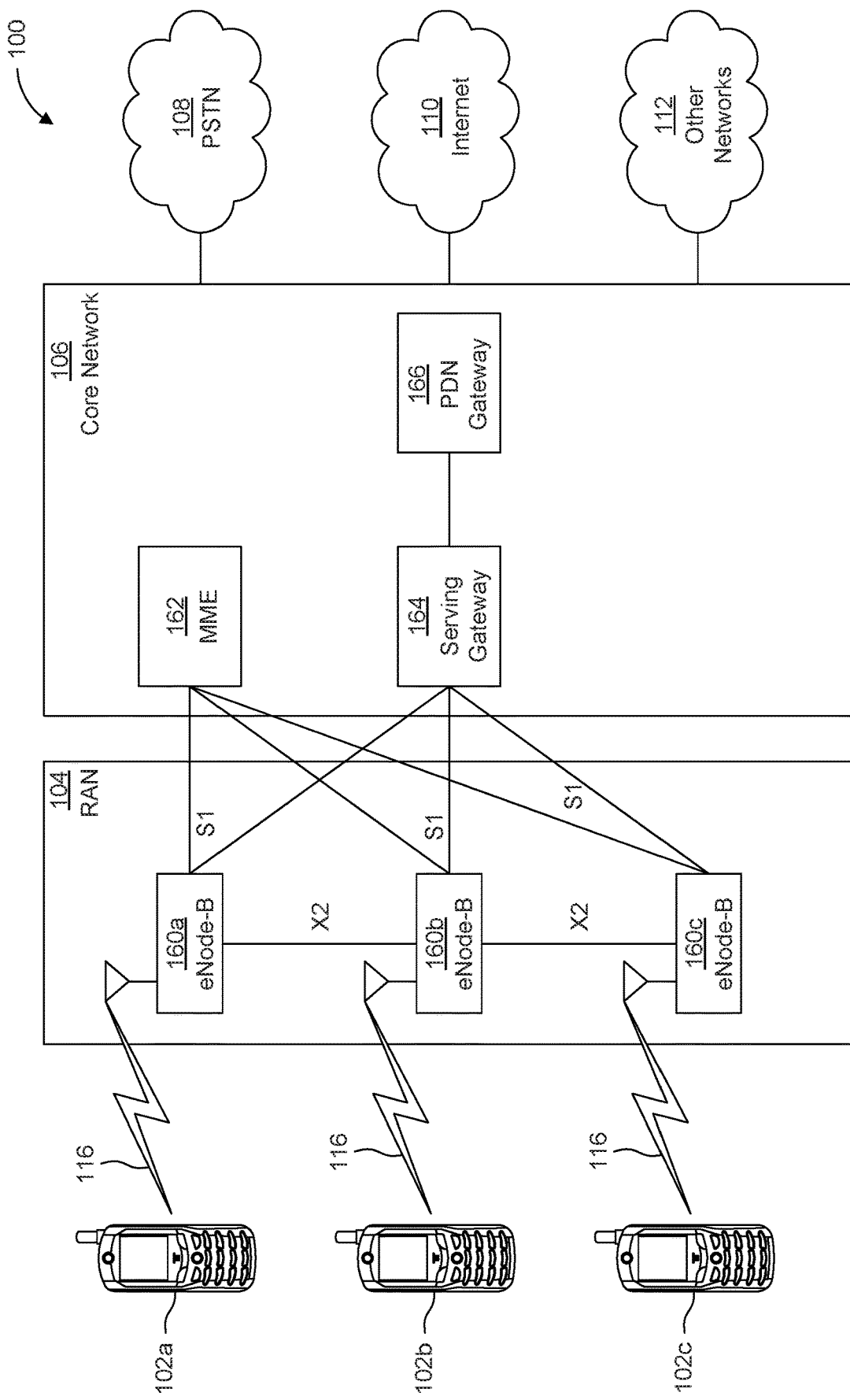
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
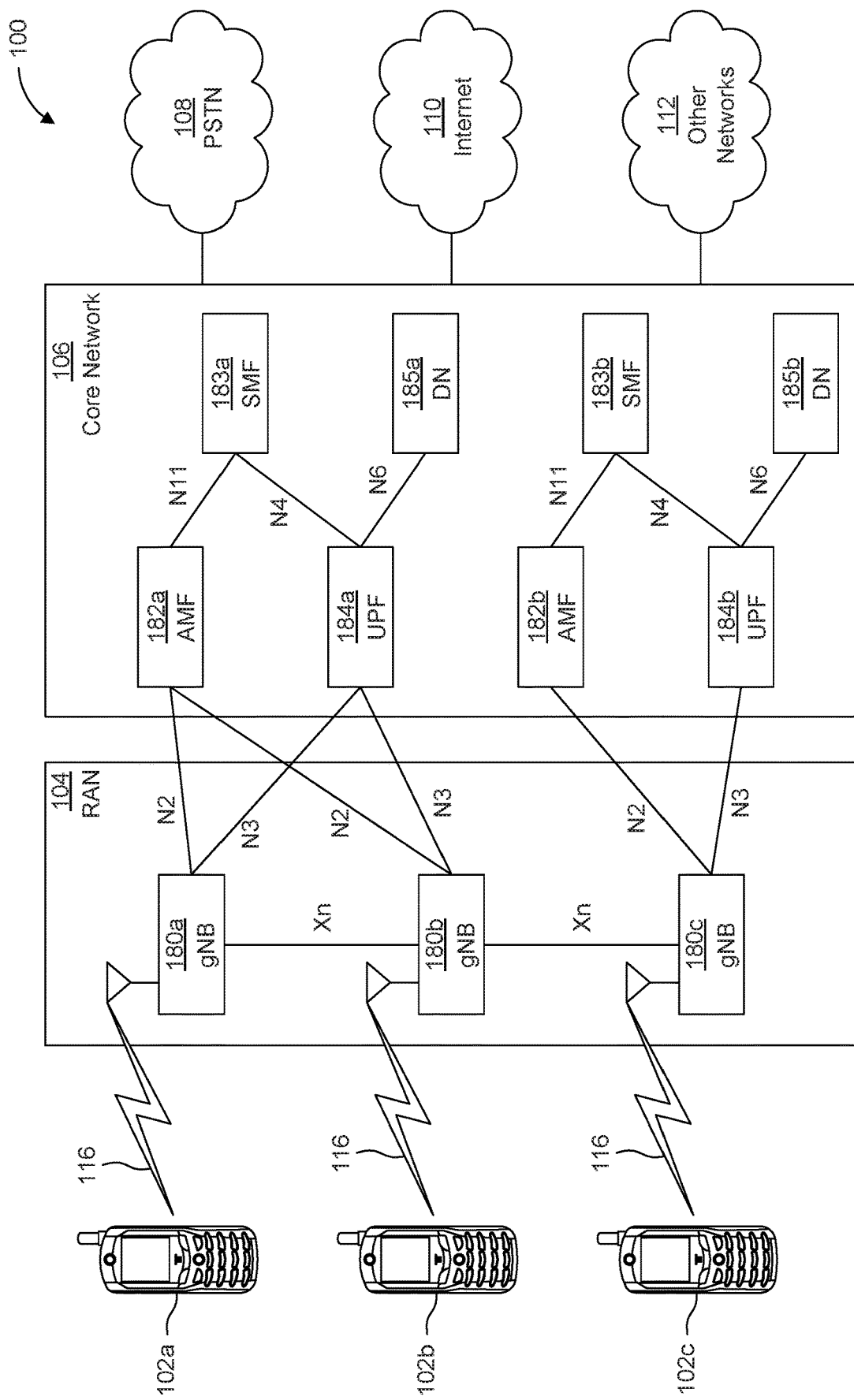
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

One way of improving the coverage range of radio telecommunications is to decrease the peak-to-average-power ratio (PAPR) or cubic metric (CM) of a transmitted signal by using discrete Fourier transform (DFT)-spread orthogonal frequency division multiplexing (OFDM) with π/2-BPSK modulation and frequency domain spectral shaping (FDSS).

Figure 2:
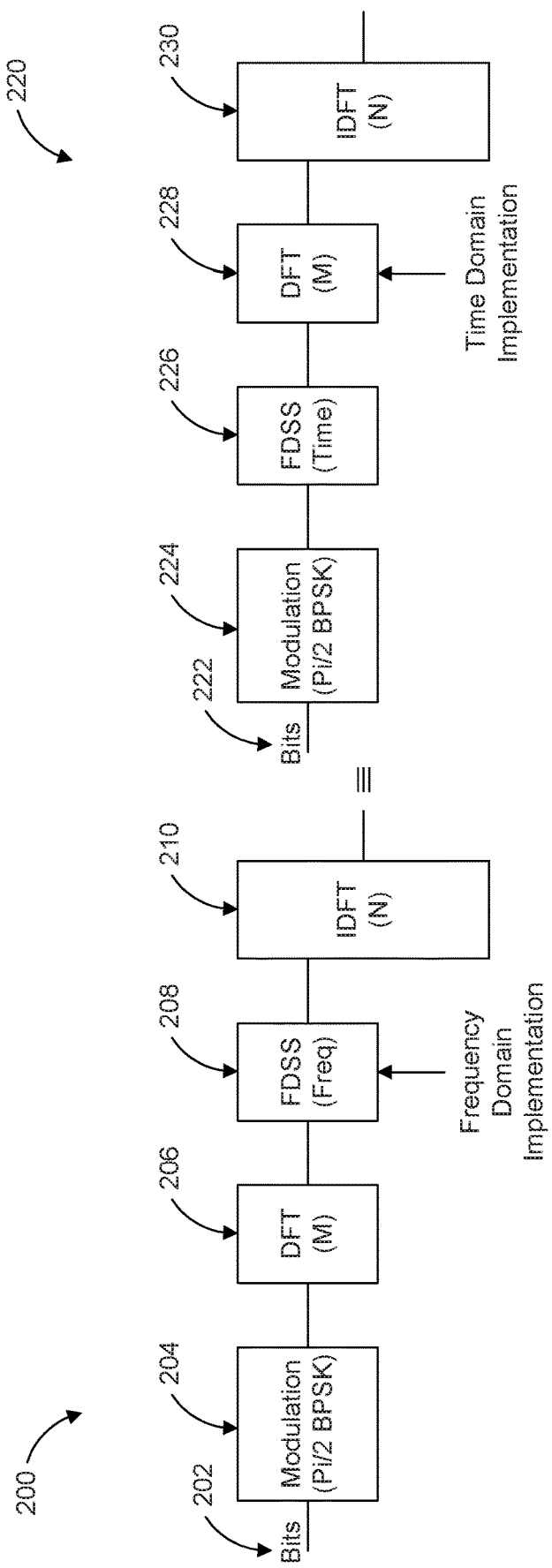
FIG. 2 is an illustration of two different implementations of 7r/2 binary phase shift keying (BPSK) discrete fourier transform (DFT) spread orthogonal frequency division multiplexing (OFDM) with frequency domain spectral shaping (FDSS)

FIG. 2 is an illustration of two different implementations 200, 220 of π/2 binary phase shift keying (BPSK) discrete fourier transform (DFT) spread orthogonal frequency division multiplexing (OFDM) with frequency domain spectral shaping (FDSS). In the first block diagram 200, bits 202 are modulated with π/2-BPSK modulation 204. The π/2-BPSK modulation 204 may be a function of previous elements in a sequence or it may be independent from other elements. In some implementations, the π/2-BPSK modulation is defined as shown in Eq. 1.

$$s(b_i) = \frac{e^{\frac{j\pi}{2}(i \bmod 2)}}{\sqrt{2}} [(1 - 2b_i) + j(1 - 2b_i)] \qquad \text{Equation 1}$$

In the above equation, $s(b_i)$ is the π/2-BPSK symbol $b_i$ is the ith symbol in sequence and i=0 corresponds to the first element of the sequence. After modulation, the generated modulation symbols may be precoded with a DFT of length M 206. Next, for FDSS operation 208, each element of the precoded vector is multiplied with a weight determined by a filter. For example, if the filtering coefficients are [0.28 1 0.28], the weights may be obtained as DFT ([1 0.28 $0_{1,M-3}$ 0.28], M), where DFT (a, M) is the M-point DFT of vector a, and $0_{M,K}$ is the zero matrix with M rows and K columns. After the FDSS operation, the inverse DFT (IDFT) 210 of the shaped precoded vector is calculated and the resulting vector may be transmitted through an RF chain.

In the second block diagram 220 of FIG. 2, bits 222 are modulated 224, an FDSS operation 226 is performed and then precoding with a DFT 228 occurs. In contrast to the first block diagram 200, the second block diagram 220 implements the FDSS 226 in the time domain. In this way, after modulation symbols are generated 224, the modulation symbols are circularly convolved with the filtering coefficients. For example, the modulation symbols are circularly convolved with [1 0.28 $0_{M-3,1}$ 0.28]. The main benefit of such a scheme may result in an increased PAPR and CM performance. An IDFT 230 is calculated and the resulting vector may be transmitted through the RF chain.

In some implementations, an interleaved demodulation reference signal (DMRS) structure is adopted for π/2-BPSK DFT-spread OFDM based data shared channels, which may be referred to as Type 1. Data shared channels may include a downlink shared channel (DL-SCH) and an uplink shared channel (UL-SCH). Other shared channels may also be used.

Figure 3:
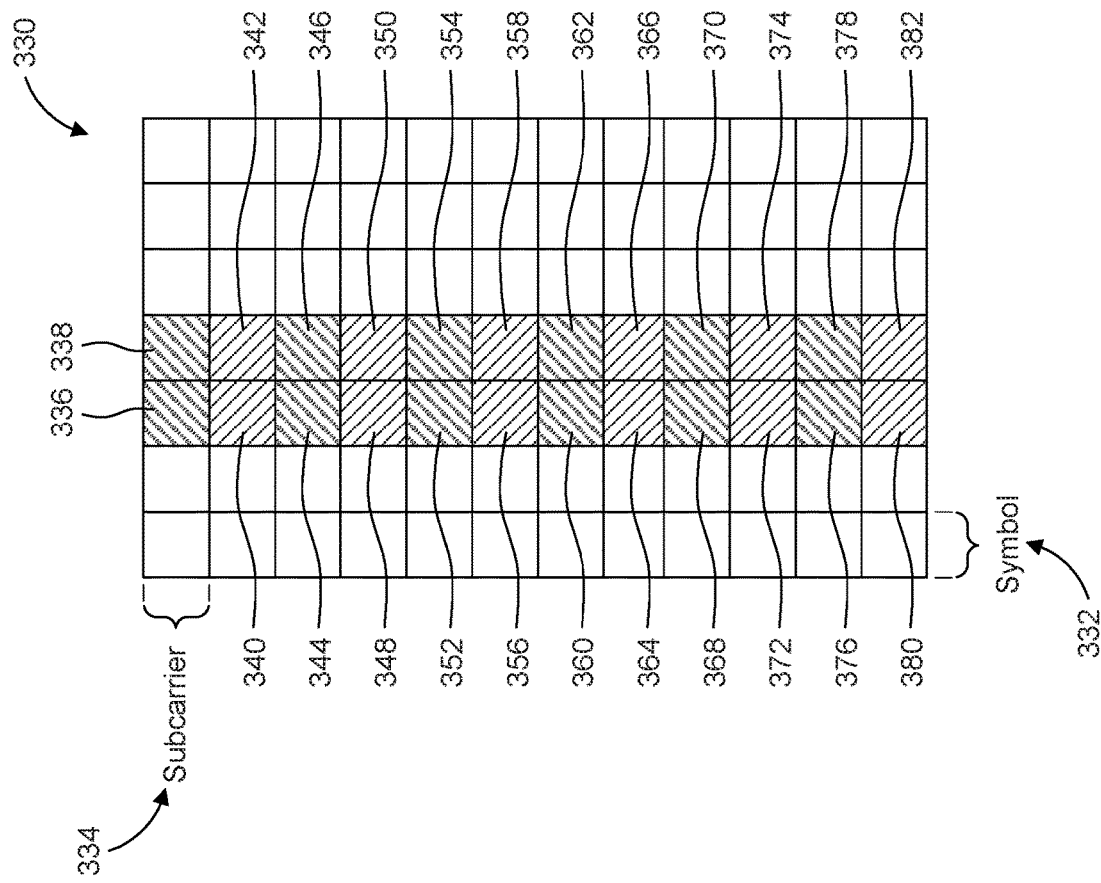
FIG. 3 is an illustration of an example time and frequency structure for Type 1.
Figure 3:
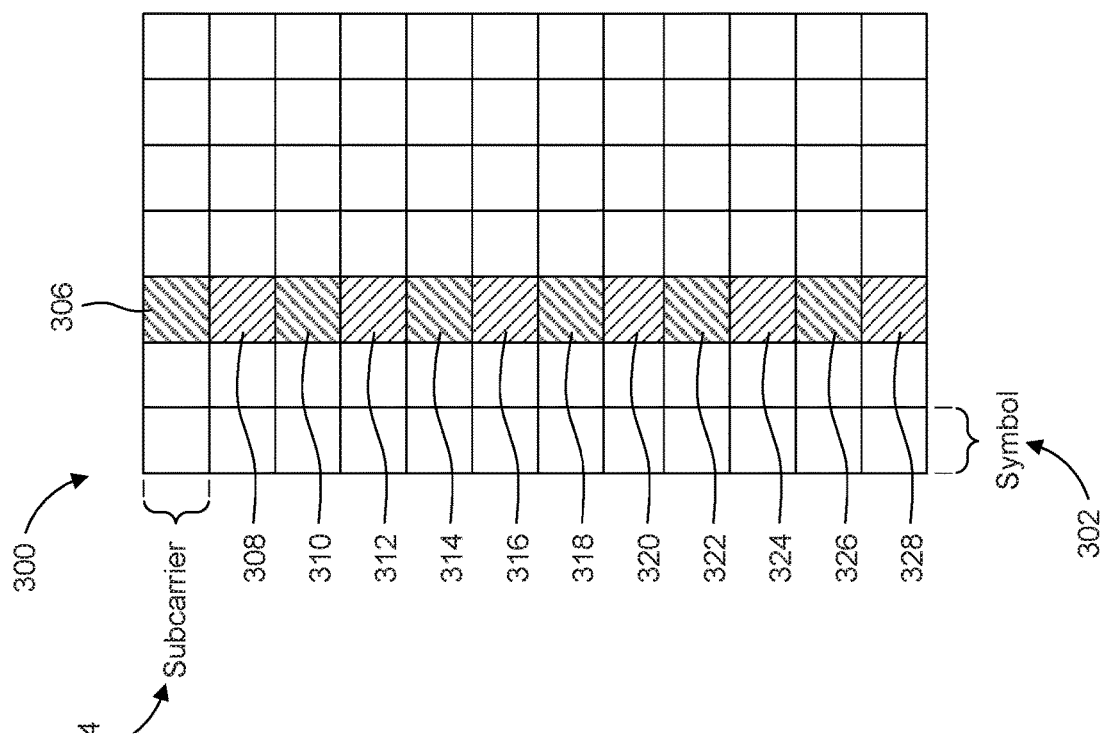

FIG. 3 is an illustration of two maps 300, 330 which illustrate an example time and frequency structure for Type 1. For example, FIG. 3 shows an example Type 1 DMRS mapping for 1 symbol 300 and example Type 1 DMRS mapping for 2 symbols 330. In this structure, the DMRS for two WTRUs, i.e. DMRS for WTRU1 and DMRS for WTRU2, may be interleaved in frequency. Depending on the number of symbols, the same structure may be repeated in time, as shown in the mapping for 2 symbols 330, to achieve a better channel estimation. In an embodiment, the DMRSs for WTRU1 and WTRU2 may be orthogonal to each other in frequency as shown, or alternatively or in combination, in time.

In example map 300, DMRS 306-328 is mapped to a symbol 302 in time and subcarrier 304 in frequency. In this example, DMRS for WTRU1 308, 312, 316, 320, 324 and 328 and DMRS for WTRU2 306, 310, 314, 318, 322 and 326 are alternated on each subcarrier of the third symbol. DMRS 306, 310, 314, 318, 322 and 326 are transmitted by WTRU2. DMRS 308, 312, 316, 320, 324 and 328 are transmitted by WTRU1.

In example map 330, DMRS is also mapped to a symbol 332 in time and subcarrier 334 in frequency. In this example, DMRS for WTRU1 and WTRU2 are alternated on each subcarrier of the third symbol and fourth symbol. DMRS 336, 338, 344, 346, 352, 354, 360, 362, 368, 370, 376 and 378 are transmitted by WTRU2. DMRS 330, 342, 348, 350, 356, 358, 364, 366, 372, 374, 380 and 382 are transmitted by WTRU1.

In some implementations, the sequences for DMRS are determined in the frequency domain with quadrature phase shift keying (QPSK) modulation. For example, Table 1 defines sequences for DMRS for length 6 (i.e., the sequence length is 6), where $s_u(n) = e^{j\phi_u(n)\pi/8}$ is the modulation operation for the sequence index u where $\phi_u(n)$ is the nth element of the uth sequence.

TABLE 1

| Sequence index u | Sequences $\phi_u(n)$ | | | | | |
|---|---|---|---|---|---|---|
| 0 | −3 | −1 | 3 | 3 | −1 | −3 |
| 1 | −3 | 3 | −1 | −1 | 3 | −3 |
| 2 | −3 | −3 | −3 | 3 | 1 | −3 |
| 3 | 1 | 1 | 1 | 3 | −1 | −3 |
| 4 | 1 | 1 | 1 | −3 | −1 | 3 |
| 5 | −3 | 1 | −1 | −3 | −3 | −3 |
| 6 | −3 | 1 | 3 | −3 | −3 | −3 |
| 7 | −3 | −1 | 1 | −3 | 1 | −1 |
| 8 | −3 | −1 | −3 | 1 | −3 | −3 |
| 9 | −3 | −3 | 1 | −3 | 3 | −3 |
| 10 | −3 | 1 | 3 | 1 | −3 | −3 |
| 11 | −3 | −1 | −3 | 1 | 1 | −3 |
| 12 | 1 | 1 | 3 | −1 | −3 | 3 |
| 13 | 1 | 1 | 3 | 3 | −1 | 3 |
| 14 | 1 | 1 | 1 | −3 | 3 | −1 |
| 15 | 1 | 1 | 1 | −1 | 3 | −3 |
| 16 | −3 | −1 | −1 | −1 | 3 | −1 |
| 17 | −3 | −3 | −1 | 1 | −1 | −3 |
| 18 | −3 | −3 | −3 | 1 | −3 | −1 |
| 19 | −3 | 1 | 1 | −3 | −1 | −3 |
| 20 | −3 | 3 | −3 | 1 | 1 | −3 |
| 21 | −3 | 1 | −3 | −3 | −3 | −1 |
| 22 | 1 | 1 | −3 | 3 | 1 | 3 |
| 23 | 1 | 1 | −3 | −3 | 1 | −3 |
| 24 | 1 | 1 | 3 | −1 | 3 | 3 |
| 25 | 1 | 1 | −3 | 1 | 3 | 3 |
| 26 | 1 | 1 | −1 | −1 | 3 | −1 |
| 27 | 1 | 1 | −1 | 3 | −1 | −1 |
| 28 | 1 | 1 | −1 | 3 | −3 | −1 |
| 29 | 1 | 1 | −3 | 1 | −1 | −1 |

In an embodiment, the modulated sequence is directly mapped to the subcarriers. It should be noted that the PAPR/CM performance of these sequences are not optimized for DFT-spread-OFDM data channels and may cause higher PAPR than that of the data with/2-BPSK DFT-spread OFDM.

Figure 4:
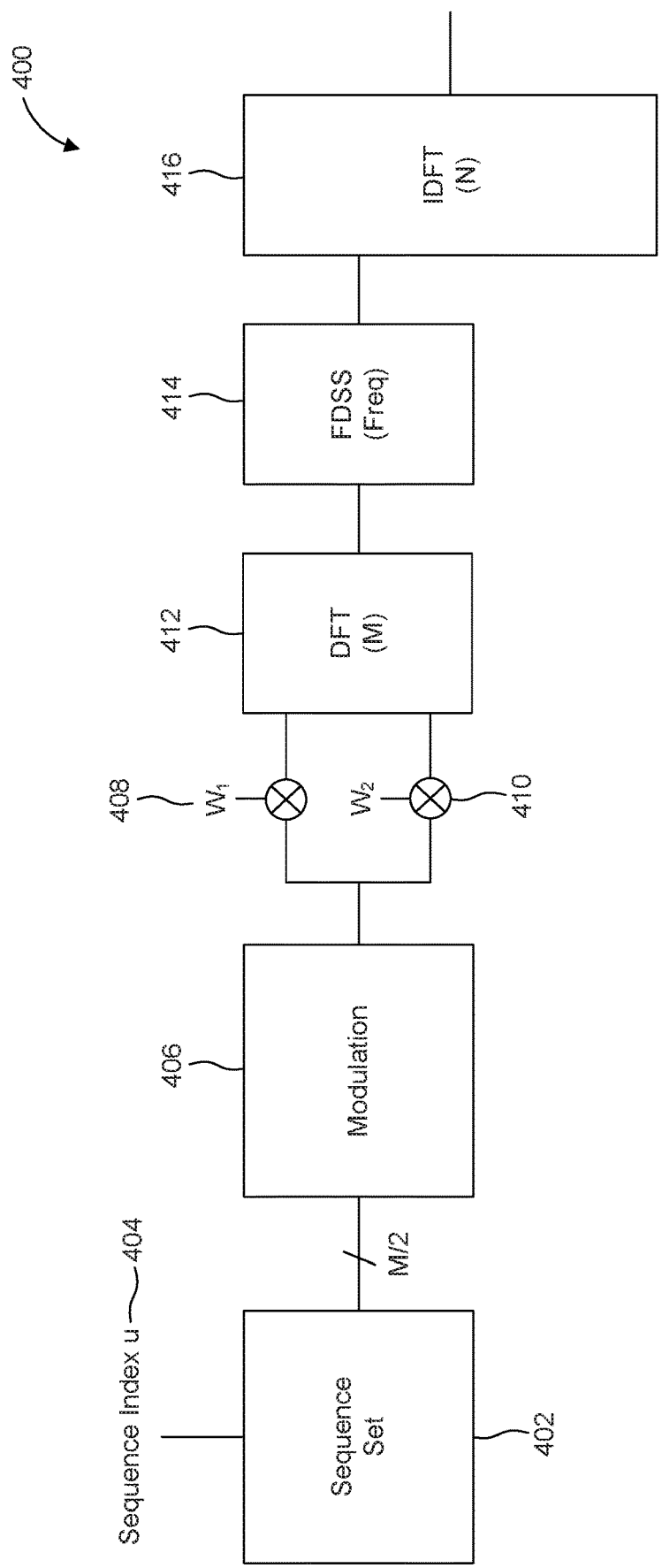
FIG. 4 is a block diagram illustrating an example transmitter for a demodulation reference signal (DMRS)

FIG. 4 is a block diagram illustrating an example transmitter 400 for DMRS which is compatible with the Type 1 mapping illustrated by FIG. 3. In this example, a sequence may be determined from a sequence set 402, based on sequence index u 404, and the chosen sequence is modulated 406 with a modulation type in the modulation block. To enable Type 1 mapping, the resulting output is repeated twice and multiplied with $w_1$ 408 and $w_2$ 410 where $w_1 = w_2$ for one WTRU and $w_1 = -w_2$ for another WTRU. The sequence is then processed by blocks in DFT-s-OFDM 412 with FDSS 414, an IDFT 416 is calculated, and the resulting vector may be transmitted.

In some examples, to achieve good performance in a cellular network, the sequence set in FIG. 4 may lead to signals with low PAPR, low CM, low cross-correlation with other DMRS signals, a larger zero autocorrelation zone to estimate the channel, and high frequency flatness to achieve better BLER performance and be compatible with spectral requirements. Several example sequences are provided herein.

Table 2 illustrates an example sequence set which may be defined for length 6, 8-PSK modulation, for DFT-s-OFDM for Type 1 mapping.

TABLE 2

| Sequence index u | Sequences $\phi_u(n)$ | | | | | |
|---|---|---|---|---|---|---|
| 1 | −7 | 5 | −7 | −3 | −5 | 5 |
| 2 | −7 | −3 | −7 | −3 | 7 | 5 |
| 3 | −7 | −3 | 3 | 7 | 3 | −3 |
| 4 | −7 | 5 | −7 | −3 | 7 | 5 |
| 5 | −7 | −3 | −7 | −3 | −5 | 5 |
| 6 | −7 | 1 | −1 | 5 | −7 | 5 |
| 7 | −7 | 5 | −1 | 1 | −3 | 1 |
| 8 | −7 | −3 | −7 | −5 | 5 | 1 |
| 9 | −7 | −5 | 3 | 7 | 5 | −1 |
| 10 | −7 | 3 | −3 | −5 | −1 | 7 |
| 11 | −7 | 1 | −3 | 1 | 7 | 5 |
| 12 | −7 | −3 | −3 | −1 | −7 | 5 |
| 13 | −7 | −7 | −3 | 1 | −3 | 7 |
| 14 | −7 | 5 | −5 | −1 | −3 | 5 |
| 15 | −7 | −1 | 5 | 7 | 5 | −1 |
| 16 | −7 | 3 | −3 | −5 | −3 | 3 |
| 17 | −7 | −3 | 3 | −1 | −7 | −5 |
| 18 | −7 | −3 | −5 | −3 | 7 | 3 |
| 19 | −7 | −1 | −3 | −1 | 7 | 3 |
| 20 | −7 | 5 | 7 | −1 | −3 | 3 |
| 21 | −7 | −1 | −3 | 5 | 7 | 3 |
| 22 | −7 | −1 | 3 | 7 | 3 | −1 |
| 23 | −7 | 3 | −1 | −5 | −1 | 3 |
| 24 | −7 | 3 | 3 | 7 | −5 | 7 |
| 25 | −7 | 5 | −7 | −3 | −3 | 7 |
| 26 | −7 | −5 | 3 | 7 | 3 | −3 |
| 27 | −7 | 3 | −1 | 3 | −5 | −3 |
| 28 | −7 | 1 | −3 | 5 | 7 | 5 |
| 29 | −7 | 5 | −3 | 1 | 1 | −1 |
| 30 | −7 | 7 | 7 | −5 | 3 | −1 |

In this example, the modulation symbols are generated with:

$$s_u(n) = e^{j\phi_u(n)\pi/8}.$$  Equation 2

Table 3 illustrates an example sequence set which may be defined for length 12, with π/2-BPSK modulation for DFT-s-OFDM for Type 1 mapping.

TABLE 3

| Sequence index u | Sequences $\phi_u(n)$ | | | | | | | | | | |
|---|---|---|---|---|---|---|---|---|---|---|---|
| 1 | 0 | 1 | 1 | 1 | 1 | 1 | 1 | 0 | 0 | 0 | 1 | 1 |
| 2 | 0 | 1 | 1 | 0 | 1 | 0 | 1 | 0 | 0 | 0 | 1 | 1 |
| 3 | 0 | 1 | 0 | 1 | 1 | 1 | 0 | 1 | 1 | 0 | 1 | 1 |
| 4 | 0 | 1 | 0 | 0 | 0 | 1 | 1 | 1 | 1 | 0 | 1 | 1 |
| 5 | 0 | 1 | 1 | 0 | 1 | 0 | 1 | 1 | 1 | 0 | 1 | 1 |
| 6 | 0 | 1 | 1 | 1 | 0 | 1 | 1 | 1 | 0 | 1 | 1 | 1 |
| 7 | 0 | 0 | 1 | 0 | 0 | 1 | 1 | 1 | 1 | 1 | 1 | 1 |
| 8 | 0 | 0 | 0 | 1 | 1 | 1 | 1 | 1 | 0 | 0 | 0 | 1 |
| 9 | 1 | 0 | 0 | 0 | 1 | 0 | 0 | 0 | 1 | 1 | 1 | 1 |
| 10 | 1 | 0 | 0 | 0 | 1 | 0 | 0 | 0 | 0 | 0 | 1 | 1 |
| 11 | 1 | 0 | 0 | 1 | 0 | 0 | 1 | 1 | 1 | 1 | 1 | 1 |

In this example, the modulation symbols are generated with $$s_u(b_i) = \frac{e^{\frac{j\pi}{2}(i \bmod 2)}}{\sqrt{2}}[(1 - 2b_i) + j(1 - 2b_i)].$$

Table 4 illustrates an example sequence set which may be defined for length 18 with π/2-BPSK modulation for DFT-s-OFDM for Type 1 mapping.

TABLE 4

| Sequence index u | Sequences $\phi_u(n)$ | | | | | | | | | | | | | | | | | |
|---|---|---|---|---|---|---|---|---|---|---|---|---|---|---|---|---|---|---|
| 1 | 0 | 1 | 1 | 0 | 1 | 1 | 1 | 0 | 0 | 0 | 0 | 0 | 0 | 0 | 1 | 1 | 0 | 0 |
| 2 | 0 | 0 | 0 | 1 | 1 | 1 | 1 | 1 | 0 | 1 | 1 | 0 | 0 | 0 | 1 | 1 | 0 | 0 |
| 3 | 0 | 0 | 0 | 1 | 1 | 1 | 0 | 1 | 1 | 0 | 0 | 0 | 0 | 1 | 1 | 0 | 0 | 0 |
| 4 | 0 | 1 | 1 | 0 | 0 | 0 | 0 | 0 | 0 | 1 | 1 | 1 | 0 | 1 | 1 | 0 | 0 | 0 |
| 5 | 0 | 1 | 1 | 1 | 0 | 1 | 0 | 1 | 1 | 0 | 0 | 0 | 0 | 1 | 1 | 0 | 0 | 0 |
| 6 | 0 | 0 | 0 | 1 | 1 | 0 | 1 | 0 | 1 | 0 | 1 | 0 | 0 | 1 | 1 | 0 | 0 | 0 |
| 7 | 0 | 0 | 0 | 1 | 0 | 0 | 1 | 0 | 0 | 1 | 0 | 0 | 1 | 1 | 1 | 1 | 1 | 1 |
| 8 | 0 | 0 | 1 | 0 | 1 | 0 | 1 | 0 | 0 | 1 | 1 | 0 | 0 | 0 | 0 | 1 | 1 | 1 |
| 9 | 1 | 1 | 0 | 0 | 1 | 0 | 1 | 1 | 1 | 0 | 1 | 0 | 0 | 1 | 1 | 1 | 0 | 1 |
| 10 | 1 | 1 | 1 | 1 | 0 | 0 | 0 | 0 | 1 | 0 | 0 | 0 | 1 | 0 | 0 | 0 | 0 | 1 |
| 11 | 1 | 1 | 1 | 0 | 0 | 0 | 0 | 1 | 0 | 0 | 0 | 1 | 0 | 0 | 0 | 0 | 1 | 1 |
| 12 | 1 | 0 | 1 | 1 | 1 | 0 | 0 | 0 | 1 | 1 | 1 | 0 | 1 | 1 | 0 | 1 | 0 | 1 |
| 13 | 1 | 0 | 1 | 1 | 0 | 1 | 0 | 1 | 1 | 1 | 0 | 0 | 0 | 0 | 0 | 1 | 1 | 0 |
| 14 | 1 | 1 | 0 | 0 | 1 | 0 | 1 | 1 | 0 | 1 | 1 | 0 | 1 | 0 | 0 | 1 | 0 | 1 |
| 15 | 0 | 0 | 0 | 0 | 0 | 1 | 1 | 1 | 0 | 1 | 1 | 0 | 1 | 0 | 1 | 1 | 0 | 0 |
| 16 | 0 | 0 | 1 | 1 | 1 | 0 | 1 | 1 | 0 | 1 | 0 | 0 | 0 | 1 | 1 | 0 | 1 | 0 |
| 17 | 1 | 1 | 1 | 0 | 1 | 0 | 1 | 1 | 0 | 1 | 0 | 0 | 0 | 0 | 0 | 1 | 1 | 0 |
| 18 | 0 | 1 | 0 | 0 | 0 | 1 | 0 | 0 | 0 | 1 | 1 | 1 | 0 | 1 | 0 | 1 | 1 | 1 |
| 19 | 1 | 0 | 0 | 0 | 1 | 0 | 1 | 0 | 1 | 0 | 0 | 1 | 1 | 1 | 0 | 1 | 0 | 1 |
| 20 | 1 | 0 | 1 | 1 | 1 | 0 | 0 | 1 | 0 | 1 | 0 | 0 | 1 | 1 | 1 | 0 | 1 | 0 |
| 21 | 1 | 1 | 1 | 1 | 0 | 0 | 0 | 1 | 1 | 0 | 1 | 1 | 1 | 0 | 1 | 0 | 0 | 0 |
| 22 | 1 | 0 | 0 | 1 | 1 | 1 | 0 | 0 | 0 | 0 | 1 | 1 | 1 | 0 | 1 | 0 | 0 | 0 |
| 23 | 1 | 0 | 0 | 0 | 0 | 1 | 1 | 1 | 0 | 0 | 1 | 0 | 0 | 0 | 1 | 0 | 1 | 1 |
| 24 | 1 | 0 | 0 | 0 | 0 | 1 | 1 | 1 | 0 | 1 | 0 | 0 | 0 | 1 | 0 | 0 | 1 | 1 |
| 25 | 0 | 0 | 0 | 0 | 0 | 0 | 0 | 0 | 1 | 0 | 0 | 1 | 0 | 0 | 1 | 1 | 1 | 1 |
| 26 | 0 | 1 | 0 | 0 | 1 | 0 | 0 | 1 | 1 | 1 | 0 | 0 | 0 | 0 | 0 | 0 | 0 | 0 |
| 27 | 1 | 1 | 0 | 1 | 1 | 0 | 1 | 0 | 0 | 1 | 0 | 0 | 0 | 0 | 0 | 0 | 0 | 0 |
| 28 | 0 | 0 | 0 | 0 | 0 | 0 | 1 | 1 | 0 | 0 | 0 | 1 | 0 | 1 | 1 | 1 | 1 | 0 |
| 29 | 1 | 0 | 0 | 0 | 1 | 0 | 1 | 1 | 1 | 0 | 0 | 0 | 0 | 0 | 0 | 0 | 0 | 1 |
| 30 | 1 | 1 | 1 | 0 | 0 | 0 | 0 | 0 | 0 | 0 | 0 | 1 | 1 | 0 | 0 | 0 | 1 | 0 |

In this example, the modulation symbols are generated with

TABLE 3-continued

| Sequence index u | Sequences $\phi_u(n)$ | | | | | | | | | | |
|---|---|---|---|---|---|---|---|---|---|---|---|
| 12 | 0 | 1 | 1 | 0 | 0 | 0 | 0 | 0 | 1 | 1 | 0 | 1 |
| 13 | 0 | 0 | 0 | 0 | 0 | 1 | 1 | 0 | 0 | 0 | 1 | 1 |
| 14 | 0 | 0 | 0 | 1 | 0 | 0 | 1 | 1 | 1 | 0 | 0 | 1 |
| 15 | 0 | 0 | 0 | 1 | 0 | 0 | 1 | 0 | 0 | 1 | 1 | 1 |
| 16 | 1 | 1 | 0 | 0 | 0 | 0 | 0 | 1 | 1 | 1 | 1 | 0 |
| 17 | 1 | 0 | 0 | 0 | 0 | 1 | 1 | 0 | 1 | 0 | 1 | 1 |
| 18 | 1 | 1 | 0 | 1 | 0 | 1 | 1 | 0 | 0 | 0 | 1 | 0 |
| 19 | 1 | 0 | 1 | 0 | 1 | 1 | 0 | 1 | 1 | 0 | 1 | 0 |
| 20 | 1 | 0 | 1 | 0 | 0 | 1 | 0 | 0 | 1 | 0 | 1 | 0 |
| 21 | 1 | 0 | 1 | 1 | 0 | 0 | 0 | 1 | 0 | 0 | 0 | 1 |
| 22 | 1 | 0 | 1 | 0 | 1 | 1 | 0 | 0 | 1 | 0 | 0 | 1 |
| 23 | 1 | 0 | 1 | 0 | 0 | 0 | 1 | 0 | 0 | 0 | 0 | 0 |
| 24 | 1 | 1 | 1 | 1 | 0 | 1 | 1 | 1 | 0 | 1 | 0 | 1 |
| 25 | 0 | 0 | 0 | 1 | 0 | 0 | 0 | 0 | 1 | 0 | 1 | 1 |
| 26 | 0 | 1 | 1 | 0 | 0 | 0 | 1 | 0 | 0 | 0 | 0 | 1 |
| 27 | 0 | 0 | 0 | 0 | 1 | 0 | 0 | 0 | 1 | 1 | 0 | 1 |
| 28 | 1 | 0 | 1 | 0 | 0 | 0 | 0 | 1 | 0 | 0 | 0 | 1 |
| 29 | 0 | 0 | 0 | 1 | 0 | 0 | 0 | 1 | 1 | 1 | 1 | 0 |
| 30 | 1 | 1 | 0 | 0 | 0 | 0 | 1 | 0 | 0 | 0 | 1 | 1 |

$$s_u(\phi_u(i)) = \frac{e^{\frac{j\pi}{2}(i \bmod 2)}}{\sqrt{2}}[(1 - 2\phi_u(i)) + j(1 - 2\phi_u(i))].$$

Table 5 illustrates an example sequence set which may be defined for length 24, with π/2-BPSK modulation for DFT-s-OFDM for Type 1 mapping.

TABLE 5

| Sequence index u | Sequences $\phi_u(n)$ |
|---|---|
| 1  | 0 1 0 1 1 0 1 0 1 0 1 0 1 1 0 1 1 0 0 1 0 0 1 1 |
| 2  | 0 1 0 0 0 1 1 0 1 0 1 0 1 1 1 0 1 0 0 1 0 0 1 1 |
| 3  | 0 1 0 0 1 0 0 1 1 1 1 1 1 1 1 1 0 0 1 0 0 1 1 |
| 4  | 0 1 1 0 1 0 1 1 0 1 1 0 0 1 0 1 0 1 0 1 0 0 1 1 |
| 5  | 0 1 0 1 0 1 0 1 1 0 0 1 0 0 1 0 1 0 0 1 0 0 1 1 |
| 6  | 0 0 0 0 1 0 1 0 0 1 0 1 0 1 0 1 1 0 0 1 0 0 1 1 |
| 7  | 1 1 0 0 1 0 1 0 0 0 0 1 1 0 0 0 1 0 0 0 1 1 1 1 |
| 8  | 0 1 0 0 1 1 1 1 1 1 0 0 0 1 0 0 0 1 1 0 0 0 0 1 |
| 9  | 0 1 1 0 0 1 0 1 1 1 0 0 0 0 0 0 1 1 0 1 0 1 1 1 |
| 10 | 0 1 1 1 0 0 0 1 0 1 0 0 1 0 1 1 1 0 0 1 0 0 0 1 |
| 11 | 1 1 0 0 1 0 0 0 1 0 1 1 1 0 1 0 0 1 0 0 0 0 0 1 |
| 12 | 1 1 1 0 1 1 0 0 0 1 0 0 0 0 1 0 0 1 0 0 0 0 0 1 |
| 13 | 0 1 0 0 0 1 1 0 1 1 0 0 1 0 1 1 0 0 0 1 1 0 1 0 |
| 14 | 1 0 0 1 0 1 0 0 1 1 0 0 0 0 1 1 1 1 1 1 0 0 0 1 |
| 15 | 1 0 0 1 0 1 0 0 1 1 0 1 1 0 1 1 0 0 0 1 0 0 1 1 |
| 16 | 0 0 0 1 1 1 1 0 0 1 0 1 0 0 1 1 1 0 1 1 1 0 0 1 |
| 17 | 1 1 0 1 0 1 1 1 0 0 1 1 1 0 0 0 0 0 1 1 0 1 0 |
| 18 | 1 0 1 1 0 1 1 0 0 0 1 0 1 1 0 1 0 0 1 0 0 0 0 1 |
| 19 | 1 1 1 1 1 0 0 1 0 0 1 1 1 1 0 1 1 1 1 1 1 0 0 |
| 20 | 1 1 1 1 0 1 0 0 1 1 0 0 1 1 0 0 0 0 0 0 0 0 0 1 |
| 21 | 1 0 1 0 0 0 1 1 1 0 1 1 0 1 0 1 1 0 1 1 0 0 0 |
| 22 | 1 0 1 0 1 1 1 0 0 0 1 0 0 0 1 0 1 0 0 1 0 0 1 1 |
| 23 | 1 1 1 1 0 0 1 0 0 0 1 1 1 1 1 0 0 1 1 1 0 1 0 1 |
| 24 | 1 0 1 1 0 1 1 0 0 0 1 0 0 0 0 1 0 0 1 0 1 1 1 0 |
| 25 | 0 0 0 0 0 0 1 1 0 0 0 1 1 1 1 1 1 0 0 0 1 1 |
| 26 | 1 1 1 0 0 0 1 1 0 0 0 0 0 0 1 1 0 0 0 1 1 1 1 |
| 27 | 0 0 0 0 0 1 1 1 0 0 1 1 1 1 1 1 0 0 1 1 1 1 0 |
| 28 | 1 1 0 0 1 1 1 0 0 0 0 0 0 1 1 1 0 0 1 1 1 1 1 |
| 29 | 0 0 0 0 1 0 0 0 0 1 0 0 1 1 1 0 1 1 1 1 0 0 1 |
| 30 | 0 1 1 1 1 0 0 1 0 0 0 0 1 0 0 0 0 1 0 0 1 1 1 1 |

The modulation symbols are generated with $$s_u(\phi_u(i)) = \frac{e^{\frac{j\pi}{2}(i \mod 2)}}{\sqrt{2}}[(1 - 2\phi_u(i)) + j(1 - 2\phi_u(i))].$$

In some implementations, for example, to achieve a good performance in a cellular network for DMRS for pi/2 BPSK DFT-spread OFDM with FDSS, the sequence set is configured to minimize one or more (or all) of the following metrics: Metric 1 [dB]: PAPR with FDSS; Metric 2 [dB]: CM with FDSS; Metric 3: Cyclic autocorrelation in time for all lags (measures frequency fluctuations); Metric 4: Cyclic autocorrelation in time for {−1,1} lags (measures if there is a zero-auto correlation zone at {−1,1} lags for channel estimation quality); Metric 5: Cyclic autocorrelation in time for {−2, −1, 1, 2} lags (measures if there is a zero-auto correlation zone at {−2, −1, 1, 2} lags for channel estimation quality); Metric 6: Cyclic autocorrelation in time for {−3, −2, −1, 1, 2, 3} lags (measures if there is a zero-auto correlation zone at {−3, −2, −1, 1, 2, 3} lags for channel estimation quality); and Metric 7: Maximum peak cross-correlation with another DMRS signal (measure of inter-cell interference).

The example distributions of metrics for the sequence sets given in Tables 2, 3, 4, and 5 are shown by considering an example FDSS with a filter of [0.28, 1, 0.28]. Table 6 shows the maximum values of the metrics corresponding to these examples.

TABLE 6

| Sequence set | Max PAPR [dB] | Max CM [dB] | Max Auto. corr | Max Auto. corr [−1, 1] | Max Auto. corr [−2, −1, 1, 2] | Max Auto. corr [−3, −2, −1, 1, 2, 3] | Max. Xcorr |
|---|---|---|---|---|---|---|---|
| Length 6 (Table 2) | 2.1946 | 0.84394 | 0.90237 | 0.2357 | 0.2357 | 0.90237 | 0.97601 |
| Length 12 (Table 3) | 1.5158 | −0.60869 | 1 | 0.33333 | 0.33333 | 0.33333 | 0.84703 |
| Length 18 (Table 4) | 1.3491 | −0.71054 | 0.66667 | 0.22222 | 0.22222 | 0.22222 | 1 |
| Length 24 (Table 5) | 1.5862 | −0.76234 | 0.83333 | 0.16667 | 0.33333 | 0.33333 | 1 |

In some implementations, the sequence sets above may perform well in terms of PAPR and CM; however, in some implementations, they may not provide good results in terms of frequency flatness, cross-correlation (inter-cell interference), and/or cyclic auto correlation (channel estimation performance). Accordingly, in some implementations, new sets of sequences for different lengths are provided.

In some implementations, the Type 1 mapping may also be changed from or may otherwise be different from the structure given in FIG. 4. For example, the properties of the sequences for different $w_1$ and $w_2$ codebooks may be altered. In some implementations, different orthogonal cover codes (OCCs), for example, $w_1$ and $w_2$, may be provided. In some implementations, $w_1$ and $w_2$ may alter the each element of the sequence differently.

Some implementations include replacement-based sets. For example, the existing sequence may be altered by replacing N sequences in existing sets, for example, sets described above with respect to Tables 2, 3, 4, and 5. For example, for length 6, N={3, 4, . . . 13, 16} replacements may be made in Table 2 with the sequences given in Table 11, for example, to improve the performance of DMRS for π/2-BPSK DFT-s-OFDM with Type 1 mapping. Table 7 illustrates an example performance improvement for a given N in this case. For length 12, N={3, 4, . . . 13, 14} replacements may be made in Table 3 with the sequences given in Table 12, for example, to improve the performance of DMRS for π/2-BPSK DFT-s-OFDM with Type 1 mapping. Table 8 illustrates an example performance improvement for a given N in this case. For length 18, N={3, 4, . . . 13, 18} replacements may be made in Table 4, with the sequences given in Table 13, for example, to improve the performance of DMRS for π/2-BPSK DFT-s-OFDM with Type 1 mapping. Table 9 illustrates an example performance improvement for a given N in this case. For length 18, N={3, 4, . . . 13, 18} replacements in may be made in Table 5 with the sequences given in Table 14, for example, to improve the performance of DMRS for π/2-BPSK DFT-s-OFDM with Type 1 mapping. Table 10 illustrates an example performance improvement for a given N in this case.

In some implementations, the indices for the final sequences in the set may be reordered, for example, using row-wise reordering. In some implementations, the order of the elements of the sequences may be reversed. In some implementations, the modulated sequences may be reversed and/or conjugated. In some implementations, these operations do not change the properties of the sequence sets.

TABLE 7

Performance of the replacement-based sets for length 6

|  | Max PAPR [dB] | Max CM [dB] | Max Auto. corr | Max Auto. corr [−1, 1] | Max Auto. corr [−2, −1, 1, 2] | Max Auto. corr [−3, −2, −1, 1, 2, 3] | Max. Xcorr |
|---|---|---|---|---|---|---|---|
| Original Sequence | 2.1946 | 0.84394 | 0.90237 | 0.2357 | 0.2357 | 0.90237 | 0.97601 |
| # of replacements: 3 | 2.1946 | 0.84394 | 0.90237 | 0.2357 | 0.33333 | 0.90237 | 0.97601 |
| # of replacements: 4 | 2.1946 | 0.84394 | 0.90237 | 0.2357 | 0.33333 | 0.90237 | 0.95784 |
| # of replacements: 5 | 2.1946 | 0.84394 | 0.90237 | 0.2357 | 0.4714 | 0.90237 | 0.95784 |
| # of replacements: 6 | 2.1946 | 0.84394 | 0.90237 | 0.2357 | 0.4714 | 0.90237 | 0.95784 |
| # of replacements: 7 | 2.1946 | 0.84394 | 0.80474 | 0.2357 | 0.4714 | 0.80474 | 0.95784 |
| # of replacements: 8 | 2.1946 | 0.84394 | 0.80474 | 0.2357 | 0.50474 | 0.80474 | 0.95784 |
| # of replacements: 9 | 2.1946 | 0.84394 | 0.80474 | 0.2357 | 0.50474 | 0.80474 | 0.95555 |
| # of replacements: 10 | 2.1946 | 0.84394 | 0.80474 | 0.2357 | 0.50474 | 0.80474 | 0.95555 |
| # of replacements: 11 | 2.1946 | 0.84394 | 0.80474 | 0.2357 | 0.50474 | 0.80474 | 0.95555 |
| # of replacements: 12 | 2.1946 | 0.84394 | 0.80474 | 0.2357 | 0.50474 | 0.80474 | 0.95555 |
| # of replacements: 13 | 2.1946 | 0.84394 | 0.80474 | 0.2357 | 0.50474 | 0.80474 | 0.93662 |
| # of replacements: 16 | 2.0691 | 0.45281 | 0.80474 | 0.2357 | 0.4714 | 0.80474 | 0.9296 |

TABLE 8

Performance of the replacement-based sets for length 12

|  | Max PAPR [dB] | Max CM [dB] | Max Auto. corr | Max Auto. corr [−1, 1] | Max Auto. corr [−2, −1, 1, 2] | Max Auto. corr [−3, −2, −1, 1, 2, 3] | Max. Xcorr |
|---|---|---|---|---|---|---|---|
| Original Sequence | 1.5158 | −0.60869 | 1 | 0.33333 | 0.33333 | 0.33333 | 0.84703 |
| # of replacements: 3 | 1.5158 | −0.60869 | 1 | 0.33333 | 0.33333 | 0.33333 | 0.83825 |
| # of replacements: 4 | 1.5158 | −0.60869 | 1 | 0.33333 | 0.33333 | 0.33333 | 0.83825 |
| # of replacements: 5 | 1.5158 | −0.60869 | 1 | 0.33333 | 0.33333 | 0.33333 | 0.83825 |
| # of replacements: 6 | 1.5158 | −0.60869 | 1 | 0.33333 | 0.33333 | 0.33333 | 0.83825 |
| # of replacements: 7 | 1.5158 | −0.60869 | 1 | 0.33333 | 0.33333 | 0.33333 | 0.83844 |
| # of replacements: 8 | 1.5158 | −0.60869 | 1 | 0 | 0.33333 | 0.33333 | 0.83703 |

TABLE 8-continued

Performance of the replacement-based sets for length 12

| | Max PAPR [dB] | Max CM [dB] | Max Auto. corr | Max Auto. corr [−1, 1] | Max Auto. corr [−2, −1, 1, 2] | Max Auto. corr [−3, −2, −1, 1, 2, 3] | Max. Xcorr |
|---|---|---|---|---|---|---|---|
| # of replacements: 9 | 1.4893 | −0.61022 | 1 | 0 | 0.33333 | 0.33333 | 0.83703 |
| # of replacements: 10 | 1.4893 | −0.61022 | 1 | 0 | 0.33333 | 0.33333 | 0.83703 |
| #of replacements: 11 | 1.4893 | −0.61022 | 1 | 0 | 0.33333 | 0.33333 | 0.83703 |
| # of replacements: 12 | 1.4893 | −0.60943 | 1 | 0 | 0.33333 | 0.33333 | 0.83703 |
| # of replacements: 13 | 1.4893 | −0.60943 | 1 | 0 | 0.33333 | 0.33333 | 0.83844 |
| # of replacements: 14 | 1.4893 | −0.60943 | 0.33333 | 0 | 0.33333 | 0.33333 | 0.83844 |

TABLE 9

Performance of the replacement-based sets for length 18

| | Max PAPR [dB] | Max CM [dB] | Max Auto. corr | Max Auto. corr [−1, 1] | Max Auto. corr [−2, −1, 1, 2] | Max Auto. corr [−3, −2, −1, 1, 2, 3] | Max. Xcorr |
|---|---|---|---|---|---|---|---|
| Original Sequence | 1.3491 | −0.71054 | 0.66667 | 0.22222 | 0.22222 | 0.22222 | 1 |
| # of replacements: 3 | 1.4523 | −0.69436 | 0.66667 | 0.22222 | 0.22222 | 0.22222 | 1 |
| # of replacements: 4 | 1.5465 | −0.71054 | 0.66667 | 0.22222 | 0.22222 | 0.22222 | 1 |
| # of replacements: 5 | 1.5465 | −0.71054 | 0.66667 | 0.22222 | 0.22222 | 0.22222 | 0.70588 |
| # of replacements: 6 | 1.5408 | −0.71054 | 0.66667 | 0.22222 | 0.22222 | 0.22222 | 0.70588 |
| # of replacements: 7 | 1.5408 | −0.71054 | 0.66667 | 0.22222 | 0.22222 | 0.22222 | 0.68998 |
| # of replacements: 8 | 1.454 | −0.69436 | 0.66667 | 0 | 0.11111 | 0.22222 | 0.68998 |
| # of replacements: 9 | 1.454 | −0.69436 | 0.55556 | 0 | 0.11111 | 0.22222 | 0.68998 |
| # of replacements: 10 | 1.5465 | −0.69436 | 0.44444 | 0 | 0.11111 | 0.11111 | 0.68998 |
| # of replacements: 11 | 1.4748 | −0.69436 | 0.44444 | 0 | 0.11111 | 0.11111 | 0.68998 |
| # of replacements: 12 | 1.4784 | −0.71054 | 0.44444 | 0 | 0.11111 | 0.11111 | 0.6878 |
| # of replacements: 13 | 1.4784 | −0.71054 | 0.33333 | 0 | 0.11111 | 0.11111 | 0.6878 |
| # of replacements: 18 | 1.4784 | −0.71054 | 0.22222 | 0 | 0.11111 | 0.11111 | 0.68925 |

TABLE 10

Performance of the replacement-based sets for length 24

| | Max PAPR [dB] | Max CM [dB] | Max Auto. corr | Max Auto. corr [−1, 1] | Max Auto. corr [−2, −1, 1, 2] | Max Auto. corr [−3, −2, −1, 1, 2, 3] | Max. Xcorr |
|---|---|---|---|---|---|---|---|
| Original Sequence | 1.5862 | −0.76234 | 0.83333 | 0.16667 | 0.33333 | 0.33333 | 1 |
| # of replacements: 3 | 1.5862 | −0.74834 | 0.83333 | 0.16667 | 0.33333 | 0.33333 | 1 |
| # of replacements: 4 | 1.5862 | −0.74834 | 0.83333 | 0.16667 | 0.33333 | 0.33333 | 1 |
| # of replacements: 5 | 1.5862 | −0.70264 | 0.83333 | 0.16667 | 0.33333 | 0.33333 | 1 |

TABLE 10-continued

Performance of the replacement-based sets for length 24

|  | Max PAPR [dB] | Max CM [dB] | Max Auto. corr | Max Auto. corr [−1, 1] | Max Auto. corr [−2, −1, 1, 2] | Max Auto. corr [−3, −2, −1, 1, 2, 3] | Max. Xcorr |
|---|---|---|---|---|---|---|---|
| # of replacements: 6 | 1.5862 | −0.76234 | 0.83333 | 0.16667 | 0.33333 | 0.33333 | 0.66944 |
| # of replacements: 7 | 1.5862 | −0.74072 | 0.83333 | 0.16667 | 0.33333 | 0.33333 | 0.66944 |
| # of replacements: 8 | 1.5862 | −0.76036 | 0.83333 | 0 | 0.33333 | 0.33333 | 0.66944 |
| # of replacements: 9 | 1.5944 | −0.70576 | 0.83333 | 0 | 0 | 0.16667 | 0.66944 |
| # of replacements: 10 | 1.5862 | −0.70264 | 0.83333 | 0 | 0 | 0.16667 | 0.66944 |
| # of replacements: 11 | 1.5987 | −0.75943 | 0.83333 | 0 | 0 | 0.16667 | 0.66944 |
| # of replacements: 12 | 1.5904 | −0.75943 | 0.33333 | 0 | 0 | 0.16667 | 0.66944 |
| # of replacements: 13 | 1.5862 | −0.74072 | 0.33333 | 0 | 0 | 0.16667 | 0.66944 |
| # of replacements: 18 | 1.5862 | −0.70576 | 0.16667 | 0 | 0 | 0 | 0.66873 |

Table 11 illustrates new sequences for replacement-based sets for length 6 (Modulation: 8-PSK).

TABLE 11

|  | Replaced Indices | Reasons | New Sequence |  |  |  |  |  |
|---|---|---|---|---|---|---|---|---|
| # of replacements: 3 | 3 | Poor inter-cell interference performance | −7 | −5 | −1 | 3 | 1 | −3 |
|  | 6 | Poor inter-cell interference performance | −7 | −3 | −7 | 7 | −5 | 5 |
|  | 7 | Poor inter-cell interference performance | −7 | −5 | −1 | −5 | 7 | 5 |
| # of replacements: 4 | 3 | Poor inter-cell interference performance | −7 | −5 | −1 | 3 | 1 | −3 |
|  | 6 | Poor inter-cell interference performance | −7 | −3 | −7 | 7 | −5 | 5 |
|  | 7 | Poor inter-cell interference performance | −7 | −5 | −7 | −1 | 5 | 1 |
|  | 28 | Poor inter-cell interference performance | −7 | −5 | −1 | −5 | 7 | 5 |
| # of replacements: 5 | 3 | Poor inter-cell interference performance | −7 | −5 | −1 | 3 | 1 | −3 |
|  | 6 | Poor inter-cell interference performance | −7 | −3 | −7 | 7 | −5 | 5 |
|  | 7 | Poor inter-cell interference performance | −7 | −5 | −7 | −1 | 5 | 1 |
|  | 27 | Poor inter-cell interference performance | −7 | −5 | −1 | −5 | 7 | 5 |
|  | 28 | Poor inter-cell interference performance | −7 | −5 | −7 | 3 | −7 | −1 |
| # of replacements: 6 | 3 | Poor inter-cell interference performance | −7 | −5 | −1 | 3 | 1 | −3 |
|  | 6 | Poor inter-cell interference performance | −7 | −3 | −7 | 7 | −5 | 5 |
|  | 7 | Poor inter-cell interference performance | −7 | −5 | −7 | −1 | 5 | 1 |
|  | 8 | Poor inter-cell interference performance | −7 | −5 | −1 | −5 | 7 | 5 |
|  | 27 | Poor inter-cell interference performance | −7 | −5 | −7 | 3 | −7 | −1 |
|  | 28 | Poor inter-cell interference performance | −7 | −3 | −7 | 5 | −5 | −1 |
| # of replacements: 7 | 3 | Poor inter-cell interference performance | −7 | −5 | −1 | 3 | 1 | −3 |
|  | 6 | Poor inter-cell interference performance | −7 | −3 | −7 | 7 | −5 | 5 |
|  | 7 | Poor inter-cell interference performance | −7 | −5 | −7 | −1 | 5 | 1 |
|  | 8 | Poor inter-cell interference performance | −7 | −5 | −1 | −5 | 7 | 5 |

TABLE 11-continued

|  | Replaced Indices | Reasons | New Sequence | | | | | |
|---|---|---|---|---|---|---|---|---|
|  | 11 | Poor inter-cell interference performance | −7 | −5 | −7 | 3 | −7 | −1 |
|  | 27 | Poor inter-cell interference performance | −7 | −3 | −7 | 5 | −5 | −1 |
|  | 28 | Poor inter-cell interference performance | −7 | −3 | 3 | −1 | 3 | −5 |
| # of replacements: 8 | 3 | Poor inter-cell interference performance | −7 | −5 | −1 | 3 | 1 | −3 |
|  | 6 | Poor inter-cell interference performance | −7 | −3 | −7 | 7 | −5 | 5 |
|  | 7 | Poor inter-cell interference performance | −7 | −5 | −7 | −1 | 5 | 1 |
|  | 8 | Poor inter-cell interference performance | −7 | −5 | −1 | −5 | 7 | 5 |
|  | 11 | Poor inter-cell interference performance | −7 | −5 | 5 | 3 | −3 | 3 |
|  | 22 | Poor inter-cell interference performance | −7 | −5 | −7 | 3 | −7 | −1 |
|  | 27 | Poor inter-cell interference performance | −7 | −3 | −7 | 5 | −5 | −1 |
|  | 28 | Poor inter-cell interference performance | −7 | −5 | −1 | −5 | 5 | 1 |
| # of replacements: 9 | 3 | Poor inter-cell interference performance | −7 | −5 | −1 | 3 | 1 | −3 |
|  | 6 | Poor inter-cell interference performance | −7 | −3 | −7 | 7 | −5 | 5 |
|  | 7 | Poor inter-cell interference performance | −7 | −5 | −7 | −1 | 5 | 1 |
|  | 8 | Poor inter-cell interference performance | −7 | −5 | −1 | −5 | 7 | 5 |
|  | 11 | Poor inter-cell interference performance | −7 | −5 | −7 | 3 | −7 | −1 |
|  | 22 | Poor inter-cell interference performance | −7 | −3 | 3 | −1 | 3 | −5 |
|  | 26 | Poor inter-cell interference performance | −7 | −3 | −7 | 5 | −5 | −1 |
|  | 27 | Poor inter-cell interference performance | −7 | −5 | −1 | −5 | 5 | 1 |
|  | 28 | Poor inter-cell interference performance | −7 | −5 | 5 | 3 | −3 | 3 |
| # of replacements: 10 | 2 | Poor inter-cell interference performance | −7 | −5 | −1 | 3 | 1 | −3 |
|  | 3 | Poor inter-cell interference performance | −7 | −3 | −7 | 7 | −5 | −1 |
|  | 6 | Poor inter-cell interference performance | −7 | −3 | −7 | 7 | −5 | 5 |
|  | 7 | Poor inter-cell interference performance | −7 | −3 | −7 | −1 | −7 | 5 |
|  | 8 | Poor inter-cell interference performance | −7 | −5 | −7 | −1 | 5 | 1 |
|  | 11 | Poor inter-cell interference performance | −7 | −5 | −1 | −5 | 7 | 5 |
|  | 22 | Poor inter-cell interference performance | −7 | −5 | −7 | 3 | −7 | −1 |
|  | 26 | Poor inter-cell interference performance | −7 | −3 | 3 | −1 | 3 | −5 |
|  | 27 | Poor inter-cell interference performance | −7 | −5 | −1 | −5 | 5 | 1 |
|  | 28 | Poor inter-cell interference performance | −7 | −5 | 5 | 3 | −3 | 3 |
| # of replacements: 11 | 1 | Poor inter-cell interference performance | −7 | −5 | −1 | 3 | 1 | −3 |
|  | 2 | Poor inter-cell interference performance | −7 | −3 | −7 | 7 | −5 | −1 |
|  | 3 | Poor inter-cell interference performance | −7 | −3 | −7 | 7 | −5 | 5 |
|  | 6 | Poor inter-cell interference performance | −7 | −3 | −7 | −1 | −7 | 5 |
|  | 7 | Poor inter-cell interference performance | −7 | −5 | −7 | −1 | 5 | 1 |
|  | 8 | Poor inter-cell interference performance | −7 | −5 | −1 | −5 | 7 | 5 |
|  | 11 | Poor inter-cell interference performance | −7 | −5 | −7 | 3 | −7 | −1 |

TABLE 11-continued

| | Replaced Indices | Reasons | New Sequence | | | | | |
|---|---|---|---|---|---|---|---|---|
| | 22 | Poor inter-cell interference performance | −7 | −3 | 3 | −1 | 3 | −5 |
| | 26 | Poor inter-cell interference performance | −7 | −3 | −7 | 3 | −7 | 5 |
| | 27 | Poor inter-cell interference performance | −7 | −5 | −1 | −5 | 5 | 1 |
| | 28 | Poor inter-cell interference performance | −7 | −5 | 5 | 3 | −3 | 3 |
| # of replacements: 12 | 1 | Poor inter-cell interference performance | −7 | −5 | −1 | 3 | 1 | −3 |
| | 2 | Poor inter-cell interference performance | −7 | −3 | −7 | 7 | −5 | −1 |
| | 3 | Poor inter-cell interference performance | −7 | −3 | −7 | 7 | −5 | 5 |
| | 6 | Poor inter-cell interference performance | −7 | −3 | −7 | −1 | −7 | 5 |
| | 7 | Poor inter-cell interference performance | −7 | −5 | −7 | −1 | 5 | 1 |
| | 8 | Poor inter-cell interference performance | −7 | −5 | −1 | −5 | 7 | 5 |
| | 11 | Poor inter-cell interference performance | −7 | −5 | −7 | 3 | −7 | −1 |
| | 13 | Poor inter-cell interference performance | −7 | −3 | 3 | −1 | 3 | −5 |
| | 22 | Poor inter-cell interference performance | −7 | −3 | −7 | 3 | −7 | 5 |
| | 26 | Poor inter-cell interference performance | −7 | −5 | −1 | −5 | 5 | 1 |
| | 27 | Poor inter-cell interference performance | −7 | −5 | 5 | 3 | −3 | 3 |
| | 28 | Poor inter-cell interference performance | −7 | −5 | 1 | −1 | −7 | 3 |
| # of replacements: 13 | 1 | Poor inter-cell interference performance | −7 | −5 | −1 | −5 | 7 | 5 |
| | 2 | Poor inter-cell interference performance | −7 | −5 | 1 | −1 | −7 | 3 |
| | 3 | Poor inter-cell interference performance | −7 | −3 | −5 | 7 | −5 | −1 |
| | 6 | Poor inter-cell interference performance | −7 | −3 | −5 | 7 | −5 | 5 |
| | 7 | Poor inter-cell interference performance | −7 | −3 | −7 | −1 | −7 | 5 |
| | 8 | Poor inter-cell interference performance | −7 | −5 | 5 | −1 | 5 | 3 |
| | 11 | Poor inter-cell interference performance | −7 | −5 | 5 | 3 | −3 | 3 |
| | 13 | Poor inter-cell interference performance | −7 | −5 | −1 | 3 | 1 | −3 |
| | 18 | Poor inter-cell interference performance | −7 | −5 | −7 | −1 | 5 | 1 |
| | 22 | Poor inter-cell interference performance | −7 | −3 | 3 | −1 | 3 | −5 |
| | 26 | Poor inter-cell interference performance | −7 | −5 | −1 | −5 | 5 | 1 |
| | 27 | Poor inter-cell interference performance | −7 | −5 | −7 | 3 | −7 | −1 |
| | 28 | Poor inter-cell interference performance | −7 | −5 | 5 | −5 | 1 | −5 |
| # of replacements: 16 | 1 | Poor inter-cell interference performance | −7 | −3 | −7 | 5 | −5 | −1 |
| | 2 | Poor inter-cell interference performance | −7 | −5 | −1 | −5 | 7 | 5 |
| | 3 | Poor inter-cell interference performance | −7 | −5 | 5 | 3 | −3 | 3 |
| | 6 | Poor inter-cell interference performance | −7 | −5 | 1 | −5 | −7 | 3 |
| | 7 | Poor inter-cell interference performance | −7 | −5 | −1 | 3 | 1 | −3 |
| | 8 | Poor inter-cell interference performance | −7 | −5 | 1 | −1 | −7 | 3 |
| | 11 | Poor inter-cell interference performance | −7 | −3 | −7 | −1 | −7 | 5 |
| | 13 | Poor inter-cell interference performance | −7 | −5 | 1 | 7 | 1 | −1 |

TABLE 11-continued

| Replaced Indices | Reasons | New Sequence | | | | | |
|---|---|---|---|---|---|---|---|
| 18 | Poor inter-cell interference performance | −7 | −5 | 7 | 1 | −3 | 5 |
| 22 | Poor inter-cell interference performance | −7 | −5 | 5 | −1 | 5 | 3 |
| 23 | Poor inter-cell interference performance | −7 | −5 | −7 | −1 | 5 | 1 |
| 26 | Poor inter-cell interference performance | −7 | −3 | 3 | −1 | −5 | −1 |
| 27 | Poor inter-cell interference performance | −7 | −5 | −1 | 7 | 3 | −3 |
| 28 | Poor inter-cell interference performance | −7 | −3 | −7 | 3 | −7 | 5 |
| 29 | Poor correlation on −1, 1 shifts | −7 | −5 | 1 | −1 | 5 | −1 |
| 30 | Poor correlation on −1, 1 shifts | −7 | −5 | 1 | −5 | 5 | 3 |

In some implementations, for example, if the sequence length is 6, at least one of the values provided in Table 11 a may be used as a value of the phase parameter ϕ(n):

TABLE 11a

| ϕ(0), . . . , ϕ(5) | | | | | |
|---|---|---|---|---|---|
| −7 | −3 | −7 | 5 | −5 | −1 |
| −7 | −5 | −1 | −5 | 7 | 5 |
| −7 | −5 | 5 | 3 | −3 | 3 |
| −7 | −5 | 1 | −5 | −7 | 3 |
| −7 | −5 | −1 | 3 | 1 | −3 |
| −7 | −5 | 1 | −1 | −7 | 3 |
| −7 | −3 | −7 | −1 | −7 | 5 |
| −7 | −5 | 1 | 7 | 1 | −1 |
| −7 | −5 | 7 | 1 | −3 | 5 |
| −7 | −5 | 5 | −1 | 5 | 3 |
| −7 | −5 | −7 | −1 | 5 | 1 |
| −7 | −3 | 3 | −1 | −5 | −1 |
| −7 | −5 | −1 | 7 | 3 | −3 |
| −7 | −3 | −7 | 3 | −7 | 5 |
| −7 | −5 | 1 | −1 | 5 | −1 |
| −7 | −5 | 1 | −5 | 5 | 3 |

Hereafter, a reversed version of a length N sequence may be considered as a same sequence. For example, a sequence ϕ(0), . . . , ϕ(N−1) and its reversed version ϕ(N−1), . . . , ϕ(0) may be considered as the same sequence.

Table 12 illustrates new sequences for replacement-based sets for length 12 (Modulation: π/2-BPSK).

TABLE 12

| | Replaced Indices | Reasons | New Sequence | | | | | | | | | | | |
|---|---|---|---|---|---|---|---|---|---|---|---|---|---|---|
| # of replacements: 3 | 17 | Poor inter-cell interference performance | 0 | 0 | 0 | 0 | 0 | 0 | 1 | 0 | 0 | 1 | 1 | 1 |
| | 19 | Poor inter-cell interference performance | 0 | 0 | 0 | 1 | 0 | 0 | 1 | 1 | 0 | 1 | 1 | 0 |
| | 29 | Poor inter-cell interference performance | 0 | 0 | 0 | 0 | 0 | 0 | 1 | 1 | 1 | 0 | 1 | 0 |
| # of replacements: 4 | 17 | Poor inter-cell interference performance | 0 | 0 | 0 | 0 | 0 | 0 | 1 | 0 | 0 | 1 | 1 | 1 |
| | 19 | Poor inter-cell interference performance | 0 | 0 | 0 | 1 | 0 | 0 | 1 | 1 | 0 | 1 | 1 | 0 |
| | 27 | Poor correlation on −1, 1 shifts | 0 | 0 | 0 | 0 | 0 | 0 | 1 | 1 | 1 | 0 | 1 | 0 |
| | 29 | Poor inter-cell interference performance | 0 | 0 | 0 | 0 | 0 | 0 | 1 | 1 | 1 | 0 | 0 | 1 |
| # of replacements: 5 | 17 | Poor inter-cell interference performance | 0 | 0 | 0 | 0 | 0 | 0 | 1 | 0 | 0 | 1 | 1 | 1 |
| | 19 | Poor inter-cell interference performance | 0 | 0 | 0 | 1 | 0 | 0 | 1 | 1 | 0 | 1 | 1 | 0 |
| | 25 | Poor correlation on −1, 1 shifts | 0 | 0 | 0 | 0 | 0 | 0 | 1 | 1 | 1 | 0 | 1 | 0 |
| | 27 | Poor correlation on −1, 1 shifts | 0 | 0 | 0 | 0 | 0 | 0 | 1 | 1 | 1 | 0 | 0 | 1 |
| | 29 | Poor inter-cell interference performance | 0 | 0 | 0 | 0 | 0 | 1 | 0 | 0 | 1 | 0 | 1 | 0 |
| # of replacements: 6 | 17 | Poor inter-cell interference performance | 0 | 0 | 0 | 0 | 0 | 0 | 1 | 0 | 0 | 1 | 1 | 1 |
| | 19 | Poor inter-cell interference performance | 0 | 0 | 0 | 1 | 0 | 0 | 1 | 0 | 0 | 1 | 1 | 1 |
| | 25 | Poor correlation on −1, 1 shifts | 0 | 0 | 0 | 0 | 0 | 0 | 1 | 1 | 1 | 0 | 1 | 0 |
| | 26 | Poor correlation on −1, 1 shifts | 0 | 0 | 0 | 0 | 0 | 1 | 1 | 1 | 0 | 0 | 1 | |

TABLE 12-continued

| | Replaced Indices | Reasons | New Sequence | | | | | | | | | | | |
|---|---|---|---|---|---|---|---|---|---|---|---|---|---|---|
| | 27 | Poor correlation on −1, 1 shifts | 0 | 0 | 0 | 0 | 0 | 1 | 0 | 0 | 1 | 0 | 1 | 0 |
| | 29 | Poor inter-cell interference performance | 0 | 0 | 0 | 0 | 1 | 1 | 1 | 0 | 0 | 1 | 1 | 1 |
| # of replacements: 7 | 17 | Poor inter-cell interference performance | 0 | 0 | 0 | 0 | 0 | 0 | 1 | 0 | 0 | 1 | 1 | 1 |
| | 19 | Poor inter-cell interference performance | 0 | 0 | 0 | 1 | 0 | 0 | 0 | 1 | 0 | 0 | 1 | 0 |
| | 25 | Poor correlation on −1, 1 shifts | 0 | 0 | 0 | 0 | 0 | 0 | 1 | 1 | 1 | 0 | 1 | 0 |
| | 26 | Poor correlation on −1, 1 shifts | 0 | 0 | 0 | 1 | 1 | 1 | 0 | 0 | 1 | 1 | 1 | 0 |
| | 27 | Poor correlation on −1, 1 shifts | 0 | 0 | 0 | 0 | 0 | 0 | 1 | 1 | 1 | 0 | 0 | 1 |
| | 28 | Poor correlation on −1, 1 shifts | 0 | 0 | 0 | 0 | 0 | 1 | 0 | 0 | 1 | 0 | 1 | 0 |
| | 29 | Poor inter-cell interference performance | 0 | 0 | 0 | 0 | 1 | 1 | 1 | 0 | 0 | 1 | 1 | 1 |
| # of replacements: 8 | 17 | Poor inter-cell interference performance | 0 | 0 | 0 | 0 | 0 | 0 | 1 | 0 | 0 | 1 | 1 | 1 |
| | 19 | Poor inter-cell interference performance | 0 | 0 | 0 | 0 | 1 | 1 | 1 | 0 | 0 | 1 | 1 | 1 |
| | 25 | Poor correlation on −1, 1 shifts | 0 | 0 | 0 | 0 | 0 | 0 | 1 | 1 | 1 | 0 | 1 | 0 |
| | 26 | Poor correlation on −1, 1 shifts | 0 | 0 | 0 | 1 | 0 | 0 | 1 | 1 | 0 | 1 | 1 | 0 |
| | 27 | Poor correlation on −1, 1 shifts | 0 | 0 | 0 | 0 | 0 | 0 | 1 | 1 | 1 | 0 | 0 | 1 |
| | 28 | Poor correlation on −1, 1 shifts | 0 | 0 | 0 | 0 | 0 | 1 | 0 | 0 | 1 | 0 | 1 | 0 |
| | 29 | Poor inter-cell interference performance | 0 | 0 | 0 | 1 | 0 | 1 | 1 | 0 | 0 | 0 | 1 | 1 |
| | 30 | Poor correlation on −1, 1 shifts | 0 | 0 | 0 | 0 | 1 | 1 | 0 | 1 | 1 | 0 | 1 | 0 |
| # of replacements: 9 | 17 | Poor inter-cell interference performance | 0 | 0 | 0 | 0 | 0 | 0 | 1 | 0 | 0 | 1 | 1 | 1 |
| | 19 | Poor inter-cell interference performance | 0 | 0 | 0 | 0 | 1 | 1 | 1 | 0 | 0 | 1 | 1 | 1 |
| | 23 | Poor correlation on −2, −1, 1, 2 shifts | 0 | 0 | 0 | 0 | 0 | 0 | 1 | 1 | 1 | 0 | 1 | 0 |
| | 25 | Poor correlation on −1, 1 shifts | 0 | 0 | 0 | 1 | 0 | 0 | 1 | 1 | 0 | 1 | 1 | 0 |
| | 26 | Poor correlation on −1, 1 shifts | 0 | 0 | 0 | 0 | 0 | 0 | 1 | 1 | 1 | 0 | 0 | 1 |
| | 27 | Poor correlation on −1, 1 shifts | 0 | 0 | 0 | 0 | 0 | 1 | 0 | 0 | 1 | 0 | 1 | 0 |
| | 28 | Poor correlation on −1, 1 shifts | 0 | 0 | 0 | 1 | 0 | 1 | 1 | 0 | 0 | 0 | 1 | 1 |
| | 29 | Poor inter-cell interference performance | 0 | 0 | 0 | 0 | 1 | 1 | 0 | 1 | 1 | 0 | 1 | 0 |
| | 30 | Poor correlation on −1, 1 shifts | 0 | 0 | 0 | 0 | 0 | 0 | 1 | 0 | 1 | 1 | 1 | 0 |
| # of replacements: 10 | 17 | Poor inter-cell interference performance | 0 | 0 | 0 | 0 | 0 | 0 | 1 | 0 | 0 | 1 | 1 | 1 |
| | 19 | Poor inter-cell interference performance | 0 | 0 | 0 | 0 | 1 | 1 | 1 | 0 | 0 | 1 | 1 | 1 |
| | 23 | Poor correlation on −2, −1, 1, 2 shifts | 0 | 0 | 0 | 0 | 0 | 0 | 1 | 1 | 1 | 0 | 1 | 0 |
| | 24 | Poor correlation on −2, −1, 1, 2 shifts | 0 | 0 | 0 | 1 | 0 | 0 | 1 | 1 | 0 | 1 | 1 | 0 |
| | 25 | Poor correlation on −1, 1 shifts | 0 | 0 | 0 | 0 | 0 | 0 | 1 | 1 | 1 | 0 | 0 | 1 |
| | 26 | Poor correlation on −1, 1 shifts | 0 | 0 | 0 | 0 | 0 | 1 | 0 | 0 | 1 | 0 | 1 | 0 |
| | 27 | Poor correlation on −1, 1 shifts | 0 | 0 | 0 | 1 | 0 | 1 | 1 | 0 | 0 | 0 | 1 | 1 |
| | 28 | Poor correlation on −1, 1 shifts | 0 | 0 | 0 | 0 | 1 | 1 | 0 | 1 | 1 | 0 | 1 | 0 |
| | 29 | Poor inter-cell interference performance | 0 | 0 | 0 | 0 | 0 | 1 | 0 | 1 | 1 | 1 | 1 | 0 |
| | 30 | Poor correlation on −1, 1 shifts | 0 | 0 | 0 | 0 | 0 | 1 | 0 | 1 | 0 | 0 | 1 | 0 |

TABLE 12-continued

| | Replaced Indices | Reasons | New Sequence | | | | | | | | | | | |
|---|---|---|---|---|---|---|---|---|---|---|---|---|---|---|
| # of replacements: 11 | 17 | Poor inter-cell interference performance | 0 | 0 | 0 | 0 | 0 | 0 | 1 | 0 | 0 | 1 | 1 | 1 |
| | 19 | Poor inter-cell interference performance | 0 | 0 | 0 | 0 | 1 | 1 | 1 | 0 | 0 | 1 | 1 | 1 |
| | 21 | Poor correlation on −2, −1, 1, 2 shifts | 0 | 0 | 0 | 0 | 0 | 0 | 1 | 1 | 1 | 0 | 1 | 0 |
| | 23 | Poor correlation on −2, −1, 1, 2 shifts | 0 | 0 | 0 | 1 | 0 | 0 | 1 | 1 | 0 | 1 | 1 | 0 |
| | 24 | Poor correlation on −2, −1, 1, 2 shifts | 0 | 0 | 0 | 0 | 0 | 0 | 1 | 1 | 1 | 0 | 0 | 1 |
| | 25 | Poor correlation on −1, 1 shifts | 0 | 0 | 0 | 0 | 0 | 1 | 0 | 0 | 1 | 0 | 1 | 0 |
| | 26 | Poor correlation on −1, 1 shifts | 0 | 0 | 0 | 1 | 0 | 1 | 1 | 0 | 0 | 0 | 1 | 1 |
| | 27 | Poor correlation on −1, 1 shifts | 0 | 0 | 0 | 0 | 1 | 1 | 0 | 1 | 1 | 0 | 1 | 0 |
| | 28 | Poor correlation on −1, 1 shifts | 0 | 0 | 0 | 0 | 0 | 0 | 1 | 0 | 1 | 1 | 1 | 0 |
| | 29 | Poor inter-cell interference performance | 0 | 0 | 0 | 0 | 0 | 1 | 0 | 1 | 0 | 0 | 1 | 0 |
| | 30 | Poor correlation on −1, 1 shifts | 0 | 0 | 0 | 0 | 0 | 1 | 0 | 1 | 1 | 1 | 1 | 1 |
| # of replacements: 12 | 14 | Poor correlation on −2, −1, 1, 2 shifts | 0 | 0 | 0 | 0 | 0 | 0 | 1 | 0 | 0 | 1 | 1 | 1 |
| | 17 | Poor inter-cell interference performance | 0 | 0 | 0 | 0 | 1 | 1 | 1 | 0 | 0 | 1 | 1 | 1 |
| | 19 | Poor inter-cell interference performance | 0 | 0 | 0 | 0 | 0 | 0 | 1 | 1 | 1 | 0 | 1 | 0 |
| | 21 | Poor correlation on −2, −1, 1, 2 shifts | 0 | 0 | 0 | 1 | 0 | 0 | 1 | 1 | 0 | 1 | 1 | 0 |
| | 23 | Poor correlation on −2, −1, 1, 2 shifts | 0 | 0 | 0 | 0 | 0 | 0 | 1 | 1 | 1 | 0 | 0 | 1 |
| | 24 | Poor correlation on −2, −1, 1, 2 shifts | 0 | 0 | 0 | 0 | 0 | 1 | 0 | 0 | 1 | 0 | 1 | 0 |
| | 25 | Poor correlation on −1, 1 shifts | 0 | 0 | 0 | 1 | 0 | 1 | 1 | 0 | 0 | 0 | 1 | 1 |
| | 26 | Poor correlation on −1, 1 shifts | 0 | 0 | 0 | 0 | 1 | 1 | 0 | 1 | 1 | 0 | 1 | 0 |
| | 27 | Poor correlation on −1, 1 shifts | 0 | 0 | 0 | 0 | 0 | 0 | 1 | 0 | 1 | 1 | 1 | 0 |
| | 28 | Poor correlation on −1, 1 shifts | 0 | 0 | 0 | 0 | 0 | 1 | 0 | 1 | 0 | 0 | 1 | 0 |
| | 29 | Poor inter-cell interference performance | 0 | 0 | 0 | 0 | 0 | 1 | 0 | 1 | 1 | 1 | 1 | 1 |
| | 30 | Poor correlation on −1, 1 shifts | 0 | 0 | 0 | 0 | 0 | 0 | 0 | 1 | 0 | 0 | 1 | 0 |
| # of replacements: 13 | 14 | Poor correlation on −2, −1, 1, 2 shifts | 0 | 0 | 0 | 0 | 0 | 0 | 1 | 0 | 0 | 1 | 1 | 1 |
| | 15 | Poor correlation on −2, −1, 1, 2 shifts | 0 | 0 | 0 | 0 | 1 | 1 | 1 | 0 | 0 | 1 | 1 | 1 |
| | 17 | Poor inter-cell interference performance | 0 | 0 | 0 | 0 | 0 | 0 | 1 | 1 | 1 | 0 | 1 | 0 |
| | 19 | Poor inter-cell interference performance | 0 | 0 | 0 | 1 | 0 | 0 | 1 | 1 | 0 | 1 | 1 | 0 |
| | 21 | Poor correlation on −2, −1, 1, 2 shifts | 0 | 0 | 0 | 0 | 0 | 0 | 1 | 1 | 1 | 0 | 0 | 1 |
| | 23 | Poor correlation on −2, −1, 1, 2 shifts | 0 | 0 | 0 | 0 | 0 | 1 | 0 | 0 | 1 | 0 | 1 | 0 |
| | 24 | Poor correlation on −2, −1, 1, 2 shifts | 0 | 0 | 0 | 1 | 0 | 1 | 1 | 0 | 0 | 0 | 1 | 1 |
| | 25 | Poor correlation on −1, 1 shifts | 0 | 0 | 0 | 0 | 1 | 1 | 0 | 1 | 1 | 0 | 1 | 0 |
| | 26 | Poor correlation on −1, 1 shifts | 0 | 0 | 0 | 0 | 0 | 0 | 1 | 0 | 1 | 1 | 1 | 0 |
| | 27 | Poor correlation on −1, 1 shifts | 0 | 0 | 0 | 0 | 0 | 1 | 0 | 1 | 0 | 0 | 1 | 0 |
| | 28 | Poor correlation on −1, 1 shifts | 0 | 0 | 0 | 0 | 0 | 1 | 0 | 1 | 1 | 1 | 1 | 1 |
| | 29 | Poor inter-cell interference performance | 0 | 0 | 0 | 0 | 0 | 0 | 0 | 1 | 0 | 0 | 1 | 0 |
| | 30 | Poor correlation on −1, 1 shifts | 0 | 0 | 0 | 1 | 0 | 0 | 0 | 1 | 0 | 0 | 1 | 0 |

TABLE 12-continued

| | Replaced Indices | Reasons | New Sequence | | | | | | | | | | | | |
|---|---|---|---|---|---|---|---|---|---|---|---|---|---|---|---|
| # of replacements: 14 | 6 | Reduced frequency flatness | 0 | 0 | 0 | 0 | 0 | 0 | 1 | 0 | 0 | 1 | 1 | 1 |
| | 14 | Poor correlation on −2, −1, 1, 2 shifts | 0 | 0 | 0 | 0 | 1 | 1 | 1 | 0 | 0 | 1 | 1 | 1 |
| | 15 | Poor correlation on −2, −1, 1, 2 shifts | 0 | 0 | 0 | 0 | 0 | 0 | 1 | 1 | 1 | 0 | 1 | 0 |
| | 17 | Poor inter-cell interference performance | 0 | 0 | 0 | 1 | 0 | 0 | 1 | 1 | 0 | 1 | 1 | 0 |
| | 19 | Poor inter-cell interference performance | 0 | 0 | 0 | 0 | 0 | 0 | 1 | 1 | 1 | 0 | 0 | 1 |
| | 21 | Poor correlation on −2, −1, 1, 2 shifts | 0 | 0 | 0 | 0 | 0 | 1 | 0 | 0 | 1 | 0 | 1 | 0 |
| | 23 | Poor correlation on −2, −1, 1, 2 shifts | 0 | 0 | 0 | 1 | 0 | 1 | 1 | 0 | 0 | 0 | 1 | 1 |
| | 24 | Poor correlation on −2, −1, 1, 2 shifts | 0 | 0 | 0 | 0 | 1 | 1 | 0 | 1 | 1 | 0 | 1 | 0 |
| | 25 | Poor correlation on −1, 1 shifts | 0 | 0 | 0 | 0 | 0 | 0 | 1 | 0 | 1 | 1 | 1 | 0 |
| | 26 | Poor correlation on −1, 1 shifts | 0 | 0 | 0 | 0 | 0 | 1 | 0 | 1 | 0 | 0 | 1 | 0 |
| | 27 | Poor correlation on −1, 1 shifts | 0 | 0 | 0 | 0 | 0 | 1 | 0 | 1 | 1 | 1 | 1 | 1 |
| | 28 | Poor correlation on −1, 1 shifts | 0 | 0 | 0 | 0 | 0 | 0 | 0 | 1 | 0 | 0 | 1 | 0 |
| | 29 | Poor inter-cell interference performance | 0 | 0 | 0 | 1 | 0 | 0 | 0 | 1 | 0 | 0 | 1 | 0 |
| | 30 | Poor correlation on −1, 1 shifts | 0 | 0 | 0 | 0 | 1 | 0 | 0 | 0 | 0 | 1 | 1 | 1 |

In some implementations, for example, if the sequence length is 12, at least one of the values provided in Table 12a may be used as a value of the phase parameter $\phi_u(n)$:

TABLE 12a

| $\phi_u(0), \ldots, \phi_u(11)$ | | | | | | | | | | | |
|---|---|---|---|---|---|---|---|---|---|---|---|
| 0 | 0 | 0 | 0 | 0 | 0 | 1 | 0 | 0 | 1 | 1 | 1 |
| 0 | 0 | 0 | 0 | 1 | 1 | 1 | 0 | 0 | 1 | 1 | 1 |
| 0 | 0 | 0 | 0 | 0 | 0 | 1 | 1 | 1 | 0 | 1 | 0 |
| 0 | 0 | 0 | 1 | 0 | 0 | 1 | 1 | 0 | 1 | 1 | 0 |
| 0 | 0 | 0 | 0 | 0 | 0 | 1 | 1 | 1 | 0 | 0 | 1 |
| 0 | 0 | 0 | 0 | 0 | 1 | 0 | 0 | 1 | 0 | 1 | 0 |

TABLE 12a-continued

| $\phi_u(0), \ldots, \phi_u(11)$ | | | | | | | | | | | |
|---|---|---|---|---|---|---|---|---|---|---|---|
| 0 | 0 | 0 | 1 | 0 | 1 | 1 | 0 | 0 | 1 | 1 | |
| 0 | 0 | 0 | 0 | 1 | 1 | 0 | 1 | 1 | 0 | 1 | 0 |
| 0 | 0 | 0 | 0 | 0 | 0 | 1 | 0 | 1 | 1 | 1 | 0 |
| 0 | 0 | 0 | 0 | 0 | 1 | 0 | 1 | 0 | 0 | 1 | 0 |
| 0 | 0 | 0 | 0 | 0 | 1 | 0 | 1 | 1 | 1 | 1 | 1 |
| 0 | 0 | 0 | 0 | 0 | 0 | 0 | 1 | 0 | 0 | 1 | 0 |
| 0 | 0 | 0 | 1 | 0 | 0 | 0 | 1 | 0 | 0 | 1 | 0 |
| 0 | 0 | 0 | 0 | 1 | 0 | 0 | 0 | 0 | 1 | 1 | 1 |

Table 13 illustrates new sequences for replacement-based sets for length 18 (Modulation: π/2-BPSK).

TABLE 13

| | Replaced Indices | Reasons | New Sequence | | | | | | | | | | | | | | | | | |
|---|---|---|---|---|---|---|---|---|---|---|---|---|---|---|---|---|---|---|---|---|
| # of replacements: 3 | 27 | Poor inter-cell interference performance | 0 | 0 | 0 | 0 | 0 | 0 | 0 | 1 | 1 | 0 | 1 | 1 | 0 | 0 | 0 | 0 | 1 |
| | 28 | Poor inter-cell interference performance | 0 | 0 | 0 | 0 | 0 | 1 | 1 | 0 | 1 | 0 | 1 | 1 | 1 | 1 | 0 | 0 | 1 | 0 |
| | 29 | Poor inter-cell interference performance | 0 | 0 | 0 | 0 | 0 | 1 | 1 | 1 | 0 | 0 | 1 | 0 | 0 | 1 | 0 | 0 | 0 | 1 |
| # of replacements: 4 | 17 | Poor inter-cell interference performance | 0 | 0 | 0 | 0 | 0 | 1 | 1 | 0 | 1 | 1 | 0 | 0 | 1 | 0 | 0 | 1 | 0 | 1 |
| | 27 | Poor inter-cell interference performance | 0 | 0 | 0 | 0 | 0 | 1 | 0 | 1 | 0 | 0 | 1 | 0 | 0 | 0 | 1 | 0 | 0 | 1 |
| | 28 | Poor inter-cell interference performance | 0 | 0 | 0 | 0 | 0 | 0 | 1 | 1 | 0 | 1 | 1 | 1 | 0 | 0 | 0 | 1 | 1 | |
| | 29 | Poor inter-cell interference performance | 0 | 0 | 0 | 0 | 1 | 1 | 1 | 0 | 0 | 0 | 1 | 1 | 1 | 0 | 1 | 1 | 1 | 0 |
| # of replacements: 5 | 17 | Poor inter-cell interference | 0 | 0 | 0 | 0 | 1 | 1 | 0 | 1 | 1 | 0 | 0 | 1 | 0 | 0 | 1 | 0 | 1 | |

TABLE 13-continued

| | Replaced Indices | Reasons | | | | | | | New Sequence | | | | | | | | | |
|---|---|---|---|---|---|---|---|---|---|---|---|---|---|---|---|---|---|---|
| | | performance | | | | | | | | | | | | | | | | |
| | 25 | Poor inter-cell interference performance | 0 | 0 | 0 | 0 | 0 | 1 | 0 | 1 | 0 | 0 | 1 | 0 | 0 | 0 | 1 | 0 | 0 | 1 |
| | 27 | Poor inter-cell interference performance | 0 | 0 | 0 | 0 | 0 | 0 | 0 | 1 | 1 | 0 | 1 | 1 | 1 | 0 | 0 | 0 | 1 | 1 |
| | 28 | Poor inter-cell interference performance | 0 | 0 | 0 | 0 | 1 | 1 | 1 | 0 | 0 | 0 | 1 | 1 | 1 | 0 | 1 | 1 | 1 | 0 |
| | 29 | Poor inter-cell interference performance | 0 | 0 | 0 | 0 | 0 | 1 | 0 | 1 | 1 | 1 | 0 | 0 | 0 | 0 | 1 | 0 | 0 | 1 |
| # of replacements: 6 | 17 | Poor inter-cell interference performance | 0 | 0 | 0 | 0 | 1 | 0 | 0 | 1 | 0 | 1 | 1 | 1 | 0 | 0 | 0 | 1 | 0 | 1 |
| | 18 | Poor inter-cell interference performance | 0 | 0 | 0 | 0 | 0 | 1 | 0 | 1 | 0 | 0 | 0 | 1 | 1 | 1 | 0 | 1 | 1 | 1 |
| | 25 | Poor inter-cell interference performance | 0 | 0 | 0 | 0 | 0 | 0 | 1 | 1 | 0 | 0 | 0 | 1 | 0 | 1 | 1 | 0 | 0 | 1 |
| | 27 | Poor inter-cell interference performance | 0 | 0 | 0 | 0 | 1 | 0 | 0 | 1 | 0 | 0 | 1 | 1 | 1 | 0 | 1 | 1 | 1 | 0 |
| | 28 | Poor inter-cell interference performance | 0 | 0 | 0 | 0 | 0 | 0 | 1 | 0 | 0 | 1 | 1 | 1 | 0 | 0 | 1 | 0 | 1 | 0 |
| | 29 | Poor inter-cell interference performance | 0 | 0 | 0 | 0 | 0 | 0 | 0 | 1 | 0 | 0 | 1 | 0 | 0 | 1 | 1 | 0 | 1 | 1 |
| # of replacements: 7 | 17 | Poor inter-cell interference performance | 0 | 0 | 0 | 0 | 1 | 0 | 0 | 1 | 0 | 1 | 1 | 1 | 0 | 0 | 0 | 1 | 0 | 1 |
| | 18 | Poor inter-cell interference performance | 0 | 0 | 0 | 0 | 0 | 1 | 0 | 1 | 0 | 0 | 0 | 1 | 1 | 1 | 0 | 1 | 1 | 1 |
| | 22 | Poor inter-cell interference performance | 0 | 0 | 0 | 0 | 0 | 0 | 1 | 1 | 0 | 0 | 0 | 1 | 0 | 1 | 1 | 0 | 0 | 1 |
| | 25 | Poor inter-cell interference performance | 0 | 0 | 0 | 0 | 1 | 0 | 0 | 1 | 0 | 0 | 1 | 1 | 1 | 0 | 1 | 1 | 1 | 0 |
| | 27 | Poor inter-cell interference performance | 0 | 0 | 0 | 0 | 0 | 0 | 1 | 0 | 0 | 1 | 1 | 1 | 0 | 0 | 1 | 0 | 1 | 0 |
| | 28 | Poor inter-cell interference performance | 0 | 0 | 0 | 0 | 0 | 0 | 0 | 1 | 0 | 0 | 1 | 0 | 0 | 1 | 1 | 0 | 1 | 1 |
| | 29 | Poor inter-cell interference performance | 0 | 0 | 0 | 0 | 1 | 1 | 1 | 0 | 0 | 0 | 1 | 1 | 1 | 0 | 1 | 1 | 1 | 0 |
| # of replacements: 8 | 17 | Poor inter-cell interference performance | 0 | 0 | 0 | 0 | 1 | 0 | 0 | 1 | 0 | 0 | 1 | 1 | 1 | 0 | 1 | 1 | 1 | 0 |
| | 18 | Poor inter-cell interference performance | 0 | 0 | 0 | 0 | 0 | 0 | 1 | 0 | 0 | 0 | 0 | 0 | 1 | 1 | 0 | 1 | 1 | 0 |
| | 22 | Poor inter-cell interference performance | 0 | 0 | 0 | 0 | 0 | 0 | 1 | 0 | 0 | 1 | 1 | 1 | 0 | 0 | 1 | 0 | 1 | 0 |
| | 25 | Poor inter-cell interference performance | 0 | 0 | 0 | 0 | 0 | 0 | 0 | 1 | 1 | 0 | 1 | 1 | 1 | 0 | 0 | 0 | 1 | 1 |
| | 27 | Poor inter-cell interference performance | 0 | 0 | 0 | 0 | 0 | 1 | 1 | 1 | 0 | 1 | 1 | 1 | 0 | 0 | 0 | 1 | 0 | 1 |
| | 28 | Poor inter-cell interference performance | 0 | 0 | 0 | 0 | 1 | 0 | 0 | 0 | 1 | 0 | 0 | 1 | 0 | 0 | 1 | 1 | 1 | 0 |
| | 29 | Poor inter-cell interference performance | 0 | 0 | 0 | 0 | 0 | 0 | 1 | 0 | 1 | 1 | 0 | 0 | 0 | 1 | 0 | 1 | 1 | 1 |
| | 30 | Poor correlation on − 1, 1 shifts | 0 | 0 | 0 | 0 | 1 | 1 | 1 | 0 | 0 | 0 | 1 | 1 | 1 | 0 | 1 | 1 | 1 | 0 |

TABLE 13-continued

| | Replaced Indices | Reasons | New Sequence | | | | | | | | | | | | | | | | |
|---|---|---|---|---|---|---|---|---|---|---|---|---|---|---|---|---|---|---|---|
| # of replacements: 9 | 13 | Reduced frequency flatness | 0 | 0 | 0 | 0 | 1 | 0 | 0 | 1 | 0 | 0 | 1 | 1 | 1 | 0 | 1 | 1 | 1 | 0 |
| | 17 | Poor inter-cell interference performance | 0 | 0 | 0 | 0 | 0 | 0 | 1 | 0 | 0 | 0 | 0 | 0 | 1 | 1 | 0 | 1 | 1 | 0 |
| | 18 | Poor inter-cell interference performance | 0 | 0 | 0 | 0 | 0 | 0 | 1 | 0 | 0 | 1 | 1 | 1 | 0 | 0 | 1 | 0 | 1 | 0 |
| | 22 | Poor inter-cell interference performance | 0 | 0 | 0 | 0 | 0 | 0 | 0 | 1 | 1 | 0 | 1 | 1 | 1 | 0 | 0 | 0 | 1 | 1 |
| | 25 | Poor inter-cell interference performance | 0 | 0 | 0 | 0 | 0 | 1 | 1 | 1 | 0 | 1 | 1 | 1 | 0 | 0 | 0 | 1 | 0 | 1 |
| | 27 | Poor inter-cell interference performance | 0 | 0 | 0 | 0 | 1 | 0 | 0 | 0 | 1 | 0 | 0 | 1 | 0 | 0 | 1 | 1 | 1 | 0 |
| | 28 | Poor inter-cell interference performance | 0 | 0 | 0 | 0 | 0 | 0 | 0 | 1 | 0 | 1 | 1 | 0 | 0 | 0 | 1 | 0 | 1 | 1 |
| | 29 | Poor inter-cell interference performance | 0 | 0 | 0 | 0 | 1 | 1 | 1 | 0 | 0 | 0 | 1 | 1 | 1 | 0 | 1 | 1 | 1 | 0 |
| | 30 | Poor correlation on − 1, 1 shifts | 0 | 0 | 0 | 0 | 0 | 0 | 1 | 0 | 0 | 1 | 1 | 0 | 1 | 0 | 0 | 0 | 1 | 1 |
| # of replacements: 10 | 13 | Reduced frequency flatness | 0 | 0 | 0 | 0 | 1 | 0 | 0 | 0 | 1 | 0 | 0 | 1 | 0 | 0 | 1 | 1 | 1 | 0 |
| | 14 | Reduced frequency flatness | 0 | 0 | 0 | 0 | 0 | 0 | 0 | 1 | 1 | 0 | 1 | 1 | 0 | 0 | 0 | 0 | 0 | 1 |
| | 17 | Poor inter-cell interference performance | 0 | 0 | 0 | 0 | 0 | 0 | 0 | 1 | 0 | 1 | 1 | 0 | 0 | 0 | 1 | 0 | 1 | 1 |
| | 18 | Poor inter-cell interference performance | 0 | 0 | 0 | 0 | 0 | 1 | 1 | 0 | 1 | 0 | 1 | 1 | 1 | 0 | 0 | 1 | 0 |  |
| | 22 | Poor inter-cell interference performance | 0 | 0 | 0 | 0 | 0 | 0 | 1 | 0 | 0 | 1 | 1 | 0 | 1 | 0 | 0 | 0 | 1 | 1 |
| | 25 | Poor inter-cell interference performance | 0 | 0 | 0 | 0 | 0 | 0 | 0 | 1 | 0 | 0 | 1 | 1 | 1 | 0 | 0 | 1 | 0 | 1 |
| | 27 | Poor inter-cell interference performance | 0 | 0 | 0 | 0 | 0 | 0 | 1 | 1 | 0 | 0 | 0 | 1 | 0 | 1 | 1 | 0 | 0 | 1 |
| | 28 | Poor inter-cell interference performance | 0 | 0 | 0 | 0 | 0 | 1 | 1 | 1 | 0 | 1 | 1 | 1 | 0 | 0 | 0 | 1 | 0 | 1 |
| | 29 | Poor inter-cell interference performance | 0 | 0 | 0 | 0 | 0 | 1 | 0 | 1 | 0 | 0 | 1 | 0 | 0 | 0 | 1 | 0 | 0 | 1 |
| | 30 | Poor correlation on −1, 1 shifts | 0 | 0 | 0 | 0 | 0 | 0 | 1 | 1 | 0 | 1 | 1 | 0 | 0 | 1 | 0 | 0 | 1 | 0 |
| # of replacements: 11 | 2 | Reduced frequency flatness | 0 | 0 | 0 | 0 | 0 | 1 | 1 | 1 | 0 | 0 | 1 | 1 | 1 | 0 | 1 | 1 | 0 |  |
| | 13 | Reduced frequency flatness | 0 | 0 | 0 | 0 | 1 | 0 | 0 | 1 | 0 | 0 | 1 | 1 | 1 | 0 | 1 | 1 | 1 | 0 |
| | 14 | Reduced frequency flatness | 0 | 0 | 0 | 0 | 0 | 0 | 0 | 1 | 1 | 0 | 1 | 1 | 0 | 0 | 0 | 0 | 0 | 1 |
| | 17 | Poor inter-cell interference performance | 0 | 0 | 0 | 0 | 0 | 1 | 0 | 1 | 1 | 1 | 0 | 0 | 0 | 0 | 1 | 0 | 0 | 1 |
| | 18 | Poor inter-cell interference performance | 0 | 0 | 0 | 0 | 0 | 1 | 1 | 0 | 1 | 0 | 1 | 1 | 1 | 0 | 0 | 1 | 0 |  |
| | 22 | Poor inter-cell interference performance | 0 | 0 | 0 | 0 | 0 | 1 | 1 | 0 | 0 | 1 | 0 | 0 | 1 | 0 | 0 | 0 | 1 |  |
| | 25 | Poor inter-cell interference performance | 0 | 0 | 0 | 0 | 0 | 0 | 1 | 1 | 0 | 1 | 1 | 1 | 0 | 0 | 1 | 1 | 1 |  |
| | 27 | Poor inter-cell interference performance | 0 | 0 | 0 | 0 | 0 | 0 | 0 | 1 | 0 | 1 | 0 | 0 | 1 | 1 | 0 | 0 | 0 | 1 |
| | 28 | Poor inter-cell interference performance | 0 | 0 | 0 | 0 | 0 | 1 | 1 | 1 | 0 | 1 | 1 | 1 | 0 | 0 | 0 | 1 | 0 | 1 |

TABLE 13-continued

| | Replaced Indices | Reasons | New Sequence |
|---|---|---|---|
| | 29 | Poor inter-cell interference performance | 0 0 0 0 0 0 1 0 0 1 1 0 1 0 0 0 1 1 |
| | 30 | Poor correlation on −1, 1 shifts | 0 0 0 0 1 1 1 0 0 0 1 1 1 0 1 1 1 0 |
| # of replacements: 12 | 2 | Reduced frequency flatness | 0 0 0 0 0 0 1 0 0 1 1 1 0 0 1 1 1 0 |
| | 13 | Reduced frequency flatness | 0 0 0 0 0 1 0 1 0 0 1 0 0 1 1 0 1 1 |
| | 14 | Reduced frequency flatness | 0 0 0 0 0 0 0 1 0 1 0 0 1 1 1 0 0 1 |
| | 16 | Reduced frequency flatness | 0 0 0 0 0 0 0 1 1 0 1 0 0 0 1 1 0 1 |
| | 17 | Poor inter-cell interference performance | 0 0 0 0 0 1 1 0 1 0 1 1 1 1 0 0 1 0 |
| | 18 | Poor inter-cell interference performance | 0 0 0 0 0 1 1 1 0 0 1 1 1 1 0 1 1 0 |
| | 22 | Poor inter-cell interference performance | 0 0 0 0 0 0 0 1 0 0 1 1 1 0 0 1 1 1 |
| | 25 | Poor inter-cell interference performance | 0 0 0 0 1 0 0 0 1 0 0 1 0 0 1 1 1 0 |
| | 27 | Poor inter-cell interference performance | 0 0 0 0 1 0 0 1 0 0 0 0 1 1 1 0 1 0 |
| | 28 | Poor inter-cell interference performance | 0 0 0 0 0 0 1 1 0 1 0 1 1 0 0 0 0 1 |
| | 29 | Poor inter-cell interference performance | 0 0 0 0 1 0 0 1 0 0 1 1 1 0 1 1 1 0 |
| | 30 | Poor correlation on − 1, 1 shifts | 0 0 0 0 0 1 0 0 1 0 0 0 0 1 1 1 0 1 |
| # of replacements: 13 | 2 | Reduced frequency flatness | 0 0 0 0 0 0 1 0 0 1 1 1 0 0 1 1 1 0 |
| | 13 | Reduced frequency flatness | 0 0 0 0 0 1 0 1 0 0 1 0 0 1 1 0 1 1 |
| | 14 | Reduced frequency flatness | 0 0 0 0 0 0 0 1 0 1 0 0 1 1 1 0 0 1 |
| | 15 | Reduced frequency flatness | 0 0 0 0 0 0 0 1 1 0 1 0 0 0 1 1 0 1 |
| | 16 | Reduced frequency flatness | 0 0 0 0 0 1 1 0 1 0 1 1 1 1 0 0 1 0 |
| | 17 | Poor inter-cell interference performance | 0 0 0 0 0 1 1 1 0 0 1 1 1 1 0 1 1 0 |
| | 18 | Poor inter-cell interference performance | 0 0 0 0 0 0 0 1 0 0 1 1 1 0 0 1 1 1 |
| | 22 | Poor inter-cell interference performance | 0 0 0 0 1 0 0 0 1 0 0 1 0 0 1 1 1 0 |
| | 25 | Poor inter-cell interference performance | 0 0 0 0 1 0 0 1 0 0 0 0 1 1 1 0 1 0 |
| | 27 | Poor inter-cell interference performance | 0 0 0 0 0 0 1 1 0 1 0 1 1 0 0 0 0 1 |
| | 28 | Poor inter-cell interference performance | 0 0 0 0 1 0 0 1 0 0 1 1 1 0 1 1 1 0 |
| | 29 | Poor inter-cell interference performance | 0 0 0 0 0 1 0 0 1 0 0 0 0 1 1 1 0 1 |
| | 30 | Poor correlation on − 1, 1 shifts | 0 0 0 0 0 1 1 1 0 0 0 1 1 0 1 1 1 0 |
| # of replacements: 18 | 1 | Reduced frequency flatness | 0 0 0 0 0 0 1 0 0 1 1 1 0 0 1 1 1 0 |
| | 2 | Reduced frequency flatness | 0 0 0 0 0 0 1 0 1 1 0 0 0 1 0 1 0 |
| | 4 | Reduced frequency flatness | 0 0 0 0 0 1 0 0 0 1 1 0 1 0 1 0 |
| | 5 | Poor correlation on −2, −1, 1, 2 shifts | 0 0 0 0 0 0 1 1 0 0 0 1 1 1 0 1 1 0 |

TABLE 13-continued

| Replaced Indices | Reasons | New Sequence |
|---|---|---|
| 13 | Reduced frequency flatness | 0 0 0 0 0 0 1 0 1 0 0 1 1 1 0 0 1 0 |
| 14 | Reduced frequency flatness | 0 0 0 0 1 0 0 1 0 0 0 0 1 1 1 0 1 0 |
| 15 | Reduced frequency flatness | 0 0 0 0 0 0 0 1 1 0 1 0 0 0 1 1 0 1 |
| 16 | Reduced frequency flatness | 0 0 0 0 0 1 0 0 1 0 0 0 0 1 1 1 0 1 |
| 17 | Poor inter-cell interference performance | 0 0 0 0 0 0 0 1 0 0 1 0 0 1 1 0 1 1 |
| 18 | Poor inter-cell interference performance | 0 0 0 0 0 0 0 1 1 0 0 0 1 1 1 0 1 1 |
| 19 | Poor correlation on −2, −1, 1, 2 shifts | 0 0 0 0 0 0 0 1 1 0 1 0 1 1 0 0 0 1 |
| 20 | Reduced frequency flatness | 0 0 0 0 0 1 0 1 1 1 0 0 0 0 1 0 0 1 |
| 22 | Poor inter-cell interference performance | 0 0 0 0 0 1 1 0 0 0 1 1 1 1 0 0 1 0 |
| 25 | Poor inter-cell interference performance | 0 0 0 0 0 0 0 1 0 1 0 0 1 1 1 0 0 1 |
| 27 | Poor inter-cell interference performance | 0 0 0 0 0 0 1 0 0 1 1 1 1 0 1 0 1 1 |
| 28 | Poor inter-cell interference performance | 0 0 0 0 1 0 0 1 0 1 1 1 0 0 1 0 0 1 |
| 29 | Poor inter-cell interference performance | 0 0 0 0 0 0 1 1 0 0 0 1 1 1 1 0 0 1 |
| 30 | Poor correlation on −1, 1 shifts | 0 0 0 0 0 1 1 1 1 1 0 0 1 0 0 1 0 |

In some implementations, for example, if the sequence length is 18, at least one of the values provided in Table 13a table may be used as a value of the phase parameter $\phi_u(n)$:

TABLE 13a $\phi_u(0), \ldots, \phi_u(17)$

| | | | | | | | | | | | | | | | | | |
|---|---|---|---|---|---|---|---|---|---|---|---|---|---|---|---|---|---|
| 0 | 0 | 0 | 0 | 0 | 0 | 1 | 0 | 0 | 1 | 1 | 1 | 0 | 0 | 1 | 1 | 1 | 0 |
| 0 | 0 | 0 | 0 | 0 | 0 | 1 | 0 | 1 | 1 | 0 | 0 | 0 | 1 | 0 | 1 | 1 | 0 |
| 0 | 0 | 0 | 0 | 0 | 0 | 1 | 0 | 0 | 0 | 1 | 1 | 0 | 1 | 0 | 1 | 1 | 0 |
| 0 | 0 | 0 | 0 | 0 | 0 | 1 | 1 | 0 | 0 | 0 | 1 | 1 | 1 | 0 | 1 | 1 | 0 |
| 0 | 0 | 0 | 0 | 0 | 0 | 1 | 0 | 1 | 0 | 0 | 1 | 1 | 1 | 0 | 0 | 1 | 0 |
| 0 | 0 | 0 | 0 | 1 | 0 | 0 | 1 | 0 | 0 | 0 | 0 | 1 | 1 | 1 | 0 | 1 | 0 |
| 0 | 0 | 0 | 0 | 0 | 0 | 1 | 1 | 0 | 1 | 0 | 0 | 0 | 1 | 1 | 0 | 1 | |
| 0 | 0 | 0 | 0 | 1 | 0 | 0 | 1 | 0 | 0 | 0 | 0 | 1 | 1 | 1 | 0 | 1 | |
| 0 | 0 | 0 | 0 | 0 | 0 | 1 | 0 | 0 | 1 | 0 | 0 | 1 | 1 | 0 | 1 | 1 | |
| 0 | 0 | 0 | 0 | 0 | 0 | 1 | 1 | 0 | 0 | 0 | 1 | 1 | 1 | 0 | 1 | 1 | |
| 0 | 0 | 0 | 0 | 0 | 0 | 1 | 1 | 0 | 1 | 0 | 1 | 1 | 0 | 0 | 0 | 1 | |
| 0 | 0 | 0 | 0 | 1 | 0 | 1 | 1 | 1 | 0 | 0 | 0 | 1 | 0 | 0 | 0 | 1 | |
| 0 | 0 | 0 | 0 | 1 | 1 | 0 | 0 | 0 | 1 | 1 | 1 | 1 | 0 | 0 | 1 | 0 | |
| 0 | 0 | 0 | 0 | 0 | 0 | 1 | 0 | 1 | 0 | 0 | 1 | 1 | 1 | 0 | 0 | 1 | |
| 0 | 0 | 0 | 0 | 0 | 1 | 0 | 0 | 1 | 1 | 1 | 1 | 0 | 1 | 0 | 1 | 1 | |
| 0 | 0 | 0 | 0 | 1 | 0 | 1 | 0 | 1 | 1 | 1 | 0 | 1 | 0 | 0 | 1 | 0 | |
| 0 | 0 | 0 | 0 | 0 | 0 | 1 | 1 | 0 | 0 | 0 | 1 | 1 | 1 | 1 | 0 | 0 | 1 |
| 0 | 0 | 0 | 0 | 0 | 0 | 1 | 1 | 1 | 1 | 1 | 0 | 0 | 1 | 0 | 0 | 1 | 0 |

Table 14 illustrates new sequences for replacement-based sets for length 24 (Modulation: π/2-BPSK).

TABLE 14

| | Replaced Indices | Reasons | New Sequence |
|---|---|---|---|
| # of replacements: 3 | 8 | Poor inter-cell interference performance | 0 0 0 0 0 0 0 0 1 1 1 0 0 1 1 0 1 0 0 0 0 0 1 1 |
| | 14 | Poor inter-cell interference performance | 0 0 0 0 0 0 0 0 1 0 0 1 0 1 1 0 1 1 1 0 0 0 1 1 |
| | 26 | Poor inter-cell interference performance | 0 0 0 0 0 0 0 0 1 1 0 1 1 0 1 1 0 0 0 0 0 1 1 0 |
| # of replacements: 4 | 8 | Poor inter-cell interference performance | 0 0 0 0 0 0 0 0 1 1 1 0 0 1 1 0 1 0 0 0 0 0 1 1 |
| | 14 | Poor inter-cell interference performance | 0 0 0 0 0 0 0 0 1 0 0 1 0 1 1 0 1 1 1 0 0 0 1 1 |
| | 26 | Poor inter-cell interference performance | 0 0 0 0 0 0 0 0 1 1 0 1 1 0 1 1 0 0 0 0 0 1 1 0 |
| | 28 | Poor inter-cell interference performance | 0 0 0 0 0 0 0 0 0 1 1 0 0 1 0 1 1 1 0 0 1 0 1 1 |
| # of replacements: 5 | 8 | Poor inter-cell interference performance | 0 0 0 0 0 0 0 1 1 0 1 1 1 0 1 1 0 0 1 0 1 1 1 0 |
| | 14 | Poor inter-cell interference performance | 0 0 0 0 0 0 0 1 1 0 1 0 0 0 1 1 0 0 0 1 1 1 0 1 |
| | 18 | Poor inter-cell interference performance | 0 0 0 0 0 0 0 1 1 0 1 0 0 1 0 0 0 0 1 1 0 0 0 1 |
| | 26 | Poor inter-cell interference performance | 0 0 0 0 0 0 0 0 0 1 0 0 1 0 0 1 0 0 1 1 1 0 0 1 |
| | 28 | Poor inter-cell interference performance | 0 0 0 0 0 0 0 1 1 1 0 0 1 0 1 0 0 1 1 1 0 0 0 1 |
| # of replacements: 6 | 8 | Poor inter-cell interference performance | 0 0 0 0 0 0 0 1 1 0 1 1 1 0 1 1 0 0 0 0 1 1 1 0 |
| | 14 | Poor inter-cell interference performance | 0 0 0 0 0 0 0 1 1 0 1 0 1 1 1 0 0 0 1 1 1 0 1 1 |
| | 18 | Poor inter-cell interference performance | 0 0 0 0 0 0 0 1 1 1 0 0 1 0 1 0 0 0 1 1 1 0 0 1 |
| | 26 | Poor inter-cell interference performance | 0 0 0 0 0 0 0 1 1 1 1 1 0 0 1 1 1 0 1 0 0 1 1 0 |
| | 28 | Poor inter-cell interference performance | 0 0 0 0 0 0 0 1 1 0 0 0 1 1 0 1 1 1 0 1 0 0 1 0 |
| | 30 | Poor inter-cell interference performance | 0 0 0 0 0 0 0 1 0 1 1 0 0 1 0 0 1 0 0 0 1 0 1 1 |

TABLE 14-continued

| | Replaced Indices | Reasons | New Sequence |
|---|---|---|---|
| # of re-placements: 7 | 8 | Poor inter-cell interference performance | 0 0 0 0 0 0 0 1 0 0 0 1 1 0 1 0 1 1 1 0 0 0 1 1 |
| | 14 | Poor inter-cell interference performance | 0 0 0 0 0 0 0 1 1 0 1 0 0 0 1 1 0 0 0 1 1 1 0 1 |
| | 15 | Poor correlation on −1, 1 shifts | 0 0 0 0 0 0 0 1 0 0 1 0 1 1 1 0 1 0 0 1 1 0 1 1 |
| | 18 | Poor inter-cell interference performance | 0 0 0 0 0 0 0 1 0 0 1 0 0 0 1 1 0 1 0 0 0 1 1 0 |
| | 26 | Poor inter-cell interference performance | 0 0 0 0 0 0 0 0 1 1 0 0 1 0 1 1 1 0 0 1 0 1 1 0 |
| | 28 | Poor inter-cell interference performance | 0 0 0 0 0 0 0 0 1 1 0 0 0 1 1 0 1 1 1 0 1 0 0 1 |
| | 30 | Poor inter-cell interference performance | 0 0 0 0 0 0 0 1 1 0 1 1 1 1 0 0 1 0 0 0 1 1 1 0 |
| # of re-placements: 8 | 8 | Poor inter-cell interference performance | 0 0 0 0 0 0 0 1 1 0 0 0 0 0 1 1 0 0 1 0 1 1 1 0 |
| | 14 | Poor inter-cell interference performance | 0 0 0 0 0 0 0 0 0 1 1 0 1 0 0 1 1 1 0 1 0 0 1 1 |
| | 15 | Poor correlation on −1, 1 shifts | 0 0 0 0 0 0 0 1 1 0 0 1 0 1 0 0 1 0 1 1 0 0 1 0 |
| | 16 | Poor correlation on −1, 1 shifts | 0 0 0 0 0 0 0 1 0 0 0 1 1 1 0 0 1 0 1 0 0 1 1 1 |
| | 18 | Poor inter-cell interference performance | 0 0 0 0 0 0 0 1 1 0 1 0 0 1 0 0 1 1 1 0 1 1 1 1 |
| | 26 | Poor inter-cell interference performance | 0 0 0 0 0 0 0 1 1 0 0 0 1 1 0 1 0 0 0 1 0 1 1 1 |
| | 28 | Poor inter-cell interference performance | 0 0 0 0 0 0 0 1 1 1 0 0 1 0 0 1 1 1 0 0 0 1 0 |
| | 30 | Poor inter-cell interference performance | 0 0 0 0 0 0 0 1 1 0 0 1 0 1 1 1 0 0 1 0 1 1 0 |
| # of re-placements: 9 | 8 | Poor inter-cell interference performance | 0 0 0 0 0 0 1 0 0 1 0 0 1 0 1 1 0 0 0 1 0 1 1 |
| | 13 | Poor correlation on −2, −1, 1, 2 shifts | 0 0 0 0 0 0 0 0 1 1 1 0 0 1 1 0 1 1 0 0 0 1 0 1 |
| | 14 | Poor inter-cell interference performance | 0 0 0 0 0 0 1 0 0 1 1 1 0 0 0 1 1 1 0 0 1 0 1 |
| | 15 | Poor correlation on −1, 1 shifts | 0 0 0 0 0 0 0 1 1 1 0 0 1 0 0 1 1 0 0 0 1 0 |

TABLE 14-continued

| | Replaced Indices | Reasons | New Sequence | | | | | | | | | | | | | | | | | | | | | | | |
|---|---|---|---|---|---|---|---|---|---|---|---|---|---|---|---|---|---|---|---|---|---|---|---|---|---|---|
| | 16 | Poor correlation on −1, 1 shifts | 0 | 0 | 0 | 0 | 0 | 0 | 0 | 1 | 1 | 0 | 1 | 1 | 0 | 1 | 0 | 1 | 0 | 0 | 1 | 1 | 0 | 1 | 1 | 0 |
| | 18 | Poor inter-cell interference performance | 0 | 0 | 0 | 0 | 0 | 0 | 0 | 1 | 1 | 0 | 0 | 1 | 0 | 1 | 0 | 1 | 1 | 1 | 0 | 1 | 0 | 0 | 1 | 1 |
| | 26 | Poor inter-cell interference performance | 0 | 0 | 0 | 0 | 0 | 0 | 0 | 0 | 0 | 1 | 1 | 0 | 0 | 0 | 0 | 0 | 1 | 1 | 0 | 1 | 1 | 0 | 1 | 1 |
| | 28 | Poor inter-cell interference performance | 0 | 0 | 0 | 0 | 0 | 0 | 0 | 1 | 1 | 0 | 1 | 1 | 1 | 1 | 0 | 0 | 1 | 0 | 0 | 1 | 0 | 0 | 1 | 0 |
| | 30 | Poor inter-cell interference performance | 0 | 0 | 0 | 0 | 0 | 0 | 0 | 1 | 0 | 0 | 0 | 1 | 0 | 1 | 1 | 0 | 0 | 1 | 0 | 0 | 1 | 1 | 1 | 1 |
| # of re-placements: 10 | 8 | Poor inter-cell interference performance | 0 | 0 | 0 | 0 | 0 | 0 | 0 | 0 | 1 | 1 | 1 | 0 | 1 | 1 | 0 | 0 | 1 | 0 | 1 | 0 | 0 | 1 | 1 | |
| | 13 | Poor correlation on −2, −1, 1, 2 shifts | 0 | 0 | 0 | 0 | 0 | 0 | 0 | 1 | 1 | 1 | 0 | 0 | 1 | 0 | 0 | 1 | 0 | 0 | 1 | 0 | 0 | 1 | 0 | 1 |
| | 14 | Poor inter-cell interference performance | 0 | 0 | 0 | 0 | 0 | 0 | 0 | 1 | 0 | 0 | 1 | 0 | 0 | 0 | 1 | 1 | 0 | 1 | 0 | 0 | 0 | 1 | 1 | 0 |
| | 15 | Poor correlation on −1, 1 shifts | 0 | 0 | 0 | 0 | 0 | 0 | 0 | 1 | 1 | 0 | 1 | 0 | 0 | 1 | 0 | 0 | 0 | 0 | 1 | 1 | 0 | 0 | 0 | 1 |
| | 16 | Poor correlation on −1, 1 shifts | 0 | 0 | 0 | 0 | 0 | 0 | 0 | 1 | 1 | 1 | 0 | 0 | 0 | 0 | 1 | 1 | 0 | 1 | 1 | 1 | 0 | 1 | 1 | 0 |
| | 18 | Poor inter-cell interference performance | 0 | 0 | 0 | 0 | 0 | 0 | 0 | 1 | 1 | 0 | 1 | 1 | 1 | 1 | 0 | 0 | 1 | 0 | 0 | 1 | 1 | 1 | 0 | |
| | 26 | Poor inter-cell interference performance | 0 | 0 | 0 | 0 | 0 | 0 | 0 | 1 | 1 | 1 | 1 | 1 | 0 | 1 | 0 | 0 | 1 | 1 | 0 | 0 | 0 | 1 | 1 | |
| | 28 | Poor inter-cell interference performance | 0 | 0 | 0 | 0 | 0 | 0 | 0 | 0 | 1 | 1 | 1 | 1 | 0 | 0 | 1 | 1 | 1 | 0 | 0 | 1 | 0 | 1 | 1 | 0 |
| | 29 | Reduced frequency flatness | 0 | 0 | 0 | 0 | 0 | 0 | 0 | 1 | 0 | 1 | 1 | 0 | 1 | 1 | 0 | 1 | 0 | 0 | 0 | 1 | 1 | 0 | 1 | 1 |
| | 30 | Poor inter-cell interference performance | 0 | 0 | 0 | 0 | 0 | 0 | 0 | 1 | 0 | 0 | 1 | 1 | 1 | 1 | 0 | 1 | 1 | 0 | 1 | 0 | 0 | 1 | 1 | 1 |
| # of re-placements: 11 | 8 | Poor inter-cell interference performance | 0 | 0 | 0 | 0 | 0 | 0 | 1 | 1 | 0 | 0 | 1 | 0 | 0 | 1 | 0 | 1 | 1 | 1 | 1 | 1 | 1 | 1 | | |
| | 13 | Poor correlation on −2, −1, 1, 2 shifts | 0 | 0 | 0 | 0 | 0 | 0 | 1 | 0 | 1 | 1 | 0 | 1 | 0 | 1 | 0 | 0 | 1 | 1 | 0 | 1 | 1 | | | |
| | 14 | Poor inter-cell interference performance | 0 | 0 | 0 | 0 | 0 | 0 | 1 | 0 | 1 | 0 | 0 | 1 | 0 | 0 | 1 | 0 | 1 | 0 | 0 | 0 | 1 | 1 | | |
| | 15 | Poor correlation on −1, 1 shifts | 0 | 0 | 0 | 0 | 0 | 0 | 0 | 1 | 0 | 0 | 1 | 0 | 1 | 1 | 0 | 1 | 1 | 1 | 0 | 0 | 0 | 1 | 1 | |

TABLE 14-continued

| | Replaced Indices | Reasons | New Sequence | | | | | | | | | | | | | | | | | | | | | | |
|---|---|---|---|---|---|---|---|---|---|---|---|---|---|---|---|---|---|---|---|---|---|---|---|---|---|
| | 16 | Poor correlation on −1, 1 shifts | 0 | 0 | 0 | 0 | 0 | 0 | 0 | 1 | 0 | 0 | 1 | 1 | 1 | 0 | 0 | 0 | 1 | 1 | 1 | 0 | 0 | 1 | 0 | 1 |
| | 18 | Poor inter-cell interference performance | 0 | 0 | 0 | 0 | 0 | 0 | 0 | 1 | 1 | 1 | 0 | 0 | 1 | 1 | 1 | 0 | 1 | 0 | 0 | 1 | 1 | 1 | 0 | 1 |
| | 25 | Reduced frequency flatness | 0 | 0 | 0 | 0 | 0 | 0 | 0 | 1 | 0 | 0 | 1 | 0 | 1 | 1 | 0 | 1 | 1 | 0 | 0 | 1 | 0 | 1 | 1 | 1 |
| | 26 | Poor inter-cell interference performance | 0 | 0 | 0 | 0 | 0 | 0 | 0 | 1 | 0 | 0 | 1 | 0 | 0 | 1 | 0 | 0 | 0 | 1 | 1 | 0 | 1 | 0 | 1 | 1 |
| | 28 | Poor inter-cell interference performance | 0 | 0 | 0 | 0 | 0 | 0 | 0 | 1 | 0 | 0 | 1 | 1 | 0 | 1 | 1 | 0 | 1 | 0 | 0 | 1 | 1 | 1 | 0 | 1 |
| | 29 | Reduced frequency flatness | 0 | 0 | 0 | 0 | 0 | 0 | 0 | 1 | 0 | 0 | 1 | 1 | 0 | 1 | 0 | 0 | 1 | 0 | 1 | 0 | 0 | 1 | 1 | 0 |
| | 30 | Poor inter-cell interference performance | 0 | 0 | 0 | 0 | 0 | 0 | 0 | 0 | 1 | 1 | 0 | 0 | 1 | 0 | 1 | 1 | 1 | 0 | 0 | 1 | 1 | 0 | 1 | 0 |
| # of replacements: 12 | 8 | Poor inter-cell interference performance | 0 | 0 | 0 | 0 | 0 | 0 | 0 | 1 | 1 | 0 | 0 | 1 | 0 | 0 | 1 | 1 | 0 | 1 | 0 | 1 | 1 | 1 | 1 | 1 |
| | 13 | Poor correlation on −2, −1, 1, 2 shifts | 0 | 0 | 0 | 0 | 0 | 0 | 0 | 1 | 0 | 1 | 1 | 0 | 0 | 1 | 1 | 1 | 1 | 0 | 1 | 0 | 0 | 1 | 1 | 1 |
| | 14 | Poor inter-cell interference performance | 0 | 0 | 0 | 0 | 0 | 0 | 0 | 1 | 0 | 1 | 0 | 0 | 1 | 0 | 0 | 1 | 0 | 0 | 1 | 0 | 0 | 1 | 1 | 1 |
| | 15 | Poor correlation on −1, 1 shifts | 0 | 0 | 0 | 0 | 0 | 0 | 0 | 0 | 1 | 0 | 1 | 0 | 1 | 1 | 0 | 1 | 1 | 1 | 0 | 0 | 0 | 1 | 1 | 1 |
| | 16 | Poor correlation on −1, 1 shifts | 0 | 0 | 0 | 0 | 0 | 0 | 0 | 1 | 0 | 0 | 1 | 1 | 1 | 0 | 0 | 0 | 1 | 1 | 1 | 0 | 0 | 1 | 0 | 1 |
| | 18 | Poor inter-cell interference performance | 0 | 0 | 0 | 0 | 0 | 0 | 0 | 1 | 0 | 0 | 1 | 0 | 1 | 1 | 0 | 1 | 1 | 0 | 0 | 1 | 0 | 1 | 1 | 1 |
| | 25 | Reduced frequency flatness | 0 | 0 | 0 | 0 | 0 | 0 | 0 | 1 | 0 | 0 | 1 | 0 | 0 | 1 | 0 | 0 | 0 | 1 | 1 | 0 | 1 | 0 | 1 | 1 |
| | 26 | Poor inter-cell interference performance | 0 | 0 | 0 | 0 | 0 | 0 | 0 | 1 | 0 | 0 | 1 | 1 | 0 | 1 | 1 | 0 | 1 | 0 | 0 | 1 | 1 | 1 | 0 | 1 |
| | 27 | Reduced frequency flatness | 0 | 0 | 0 | 0 | 0 | 0 | 0 | 1 | 0 | 0 | 1 | 1 | 0 | 1 | 0 | 0 | 1 | 0 | 1 | 0 | 0 | 1 | 1 | 0 |
| | 28 | Poor inter-cell interference performance | 0 | 0 | 0 | 0 | 0 | 0 | 0 | 0 | 1 | 1 | 0 | 0 | 1 | 0 | 1 | 1 | 1 | 0 | 0 | 1 | 1 | 0 | 1 | 0 |
| | 29 | Reduced frequency flatness | 0 | 0 | 0 | 0 | 0 | 0 | 0 | 1 | 1 | 1 | 0 | 0 | 0 | 1 | 0 | 0 | 1 | 1 | 1 | 1 | 0 | 1 | 1 | 0 |
| | 30 | Poor inter-cell interference performance | 0 | 0 | 0 | 0 | 0 | 0 | 0 | 1 | 1 | 0 | 1 | 0 | 0 | 1 | 0 | 0 | 1 | 0 | 1 | 1 | 0 | 0 | 0 | 1 |
| # of replacements: 13 | 5 | Reduced frequency flatness | 0 | 0 | 0 | 0 | 0 | 0 | 0 | 0 | 0 | 1 | 1 | 0 | 0 | 0 | 0 | 0 | 1 | 1 | 0 | 1 | 1 | 0 | 1 | 1 |
| | 8 | Poor inter-cell interference performance | 0 | 0 | 0 | 0 | 0 | 0 | 0 | 1 | 0 | 0 | 1 | 0 | 1 | 1 | 1 | 0 | 1 | 1 | 0 | 0 | 0 | 1 | 1 | |

TABLE 14-continued

| Replaced Indices | Reasons | New Sequence | | | | | | | | | | | | | | | | | | | | | | |
|---|---|---|---|---|---|---|---|---|---|---|---|---|---|---|---|---|---|---|---|---|---|---|---|---|
| 13 | Poor correlation on −2, −1, 1, 2 shifts | 0 | 0 | 0 | 0 | 0 | 0 | 0 | 0 | 1 | 1 | 1 | 1 | 0 | 0 | 1 | 1 | 1 | 0 | 0 | 1 | 0 | 1 | 1 | 0 |
| 14 | Poor inter-cell interference performance | 0 | 0 | 0 | 0 | 0 | 0 | 0 | 1 | 1 | 0 | 0 | 0 | 1 | 0 | 1 | 1 | 0 | 0 | 0 | 1 | 0 | 0 | 1 | 0 |
| 15 | Poor correlation on −1, 1 shifts | 0 | 0 | 0 | 0 | 0 | 0 | 0 | 1 | 0 | 0 | 1 | 1 | 0 | 1 | 1 | 0 | 1 | 0 | 0 | 1 | 1 | 1 | 0 | 1 |
| 16 | Poor correlation on −1, 1 shifts | 0 | 0 | 0 | 0 | 0 | 0 | 0 | 0 | 1 | 1 | 0 | 0 | 0 | 1 | 1 | 0 | 0 | 1 | 0 | 1 | 1 | 1 | 1 | 1 |
| 18 | Poor inter-cell interference performance | 0 | 0 | 0 | 0 | 0 | 0 | 0 | 0 | 1 | 1 | 0 | 1 | 1 | 1 | 1 | 0 | 0 | 1 | 0 | 0 | 1 | 0 | 0 | 1 |
| 25 | Reduced frequency flatness | 0 | 0 | 0 | 0 | 0 | 0 | 0 | 1 | 0 | 0 | 1 | 0 | 0 | 1 | 0 | 0 | 0 | 1 | 1 | 0 | 1 | 0 | 1 | 1 |
| 26 | Poor inter-cell interference performance | 0 | 0 | 0 | 0 | 0 | 0 | 0 | 0 | 1 | 0 | 1 | 1 | 0 | 0 | 1 | 1 | 1 | 0 | 1 | 0 | 0 | 0 | 1 | 1 |
| 27 | Reduced frequency flatness | 0 | 0 | 0 | 0 | 0 | 0 | 0 | 1 | 0 | 0 | 1 | 0 | 1 | 1 | 0 | 1 | 1 | 1 | 0 | 0 | 0 | 1 | 1 | 0 |
| 28 | Poor inter-cell interference performance | 0 | 0 | 0 | 0 | 0 | 0 | 0 | 0 | 1 | 1 | 1 | 1 | 1 | 0 | 1 | 0 | 0 | 1 | 1 | 0 | 0 | 0 | 1 | 1 |
| 29 | Reduced frequency flatness | 0 | 0 | 0 | 0 | 0 | 0 | 0 | 1 | 0 | 0 | 1 | 0 | 0 | 0 | 1 | 1 | 0 | 1 | 0 | 0 | 0 | 1 | 1 | 0 |
| 30 | Poor inter-cell interference performance | 0 | 0 | 0 | 0 | 0 | 0 | 0 | 0 | 1 | 1 | 0 | 1 | 1 | 0 | 0 | 0 | 1 | 1 | 1 | 0 | 0 | 0 | 0 | 1 | of replacements: 18

| Replaced Indices | Reasons | New Sequence | | | | | | | | | | | | | | | | | | | | | | |
|---|---|---|---|---|---|---|---|---|---|---|---|---|---|---|---|---|---|---|---|---|---|---|---|---|
| 1 | Reduced frequency flatness | 0 | 0 | 0 | 0 | 0 | 0 | 0 | 0 | 1 | 1 | 0 | 0 | 0 | 1 | 1 | 1 | 0 | 1 | 1 | 0 | 1 | 0 | 0 | 1 |
| 2 | Reduced frequency flatness | 0 | 0 | 0 | 0 | 0 | 0 | 0 | 0 | 1 | 0 | 1 | 0 | 0 | 1 | 1 | 0 | 1 | 1 | 0 | 0 | 1 | 1 | 1 | 0 |
| 3 | Reduced frequency flatness | 0 | 0 | 0 | 0 | 0 | 0 | 0 | 1 | 0 | 0 | 0 | 1 | 1 | 0 | 0 | 0 | 1 | 1 | 1 | 0 | 1 | 0 | 1 | 1 |
| 4 | Reduced frequency flatness | 0 | 0 | 0 | 0 | 0 | 0 | 0 | 0 | 1 | 0 | 0 | 1 | 0 | 0 | 1 | 0 | 0 | 1 | 1 | 1 | 0 | 0 | 0 | 1 |
| 5 | Reduced frequency flatness | 0 | 0 | 0 | 0 | 0 | 0 | 0 | 1 | 0 | 0 | 1 | 1 | 1 | 1 | 0 | 0 | 0 | 1 | 1 | 1 | 1 | 0 | 0 | 1 |
| 8 | Poor inter-cell interference performance | 0 | 0 | 0 | 0 | 0 | 0 | 0 | 1 | 1 | 1 | 0 | 0 | 0 | 1 | 0 | 0 | 1 | 1 | 1 | 1 | 0 | 1 | 1 | 1 |
| 13 | Poor correlation on −2, −1, 1, 2 shifts | 0 | 0 | 0 | 0 | 0 | 0 | 0 | 0 | 1 | 1 | 0 | 0 | 0 | 0 | 0 | 1 | 1 | 0 | 1 | 1 | 0 | 1 | 1 | 0 |
| 14 | Poor inter-cell interference performance | 0 | 0 | 0 | 0 | 0 | 0 | 0 | 1 | 0 | 1 | 1 | 1 | 0 | 1 | 0 | 0 | 1 | 1 | 0 | 1 | 1 | 0 | 0 | 1 |
| 15 | Poor correlation on −1, 1 shifts | 0 | 0 | 0 | 0 | 0 | 0 | 0 | 1 | 1 | 0 | 1 | 1 | 1 | 0 | 1 | 0 | 1 | 1 | 0 | 1 | 1 | 0 | 1 | 1 |
| 16 | Poor correlation on −1, 1 shifts | 0 | 0 | 0 | 0 | 0 | 0 | 0 | 1 | 0 | 0 | 1 | 0 | 1 | 1 | 0 | 1 | 1 | 1 | 0 | 0 | 0 | 1 | 1 | 0 |

TABLE 14-continued

| Replaced Indices | Reasons | New Sequence | | | | | | | | | | | | | | | | | | | | | | | |
|---|---|---|---|---|---|---|---|---|---|---|---|---|---|---|---|---|---|---|---|---|---|---|---|---|---|
| 17 | Reduced frequency flatness | 0 | 0 | 0 | 0 | 0 | 0 | 0 | 0 | 0 | 1 | 0 | 1 | 1 | 0 | 0 | 1 | 1 | 1 | 0 | 0 | 1 | 1 | 1 | 1 |
| 18 | Poor inter-cell interference performance | 0 | 0 | 0 | 0 | 0 | 0 | 0 | 0 | 1 | 1 | 1 | 0 | 0 | 1 | 1 | 1 | 1 | 0 | 0 | 0 | 0 | 0 | 1 | 1 |
| 25 | Reduced frequency flatness | 0 | 0 | 0 | 0 | 0 | 0 | 0 | 1 | 1 | 0 | 1 | 1 | 1 | 0 | 0 | 0 | 0 | 1 | 0 | 0 | 1 | 1 | 0 | 1 |
| 26 | Poor inter-cell interference performance | 0 | 0 | 0 | 0 | 0 | 0 | 0 | 0 | 1 | 1 | 0 | 1 | 1 | 0 | 1 | 0 | 1 | 0 | 0 | 1 | 1 | 0 | 1 | 1 |
| 27 | Reduced frequency flatness | 0 | 0 | 0 | 0 | 0 | 0 | 0 | 0 | 0 | 1 | 1 | 0 | 0 | 1 | 0 | 1 | 0 | 0 | 1 | 1 | 0 | 1 | 1 | 1 |
| 28 | Poor inter-cell interference performance | 0 | 0 | 0 | 0 | 0 | 0 | 0 | 1 | 0 | 0 | 0 | 1 | 1 | 1 | 1 | 0 | 0 | 1 | 0 | 0 | 0 | 0 | 1 | 1 |
| 29 | Reduced frequency flatness | 0 | 0 | 0 | 0 | 0 | 0 | 0 | 0 | 1 | 1 | 0 | 1 | 1 | 0 | 1 | 1 | 0 | 0 | 0 | 0 | 0 | 1 | 1 | 0 |
| 30 | Poor inter-cell interference performance | 0 | 0 | 0 | 0 | 0 | 0 | 0 | 1 | 0 | 0 | 1 | 0 | 1 | 1 | 1 | 0 | 1 | 0 | 0 | 1 | 1 | 0 | 1 | 1 |

In some implementations, for example, if the sequence length is 24, at least one of the values provided in Table 14a may be used as a value of the phase parameter $\phi_u(n)$:

TABLE 14a $\phi_u(0), \ldots, \phi_u(23)$

| | | | | | | | | | | | | | | | | | | | | | | | |
|---|---|---|---|---|---|---|---|---|---|---|---|---|---|---|---|---|---|---|---|---|---|---|---|
| 0 | 0 | 0 | 0 | 0 | 0 | 0 | 0 | 1 | 1 | 0 | 0 | 0 | 1 | 1 | 1 | 0 | 1 | 1 | 0 | 1 | 0 | 0 | 1 |
| 0 | 0 | 0 | 0 | 0 | 0 | 0 | 0 | 1 | 0 | 1 | 0 | 0 | 1 | 1 | 0 | 1 | 1 | 0 | 0 | 1 | 1 | 1 | 0 |
| 0 | 0 | 0 | 0 | 0 | 0 | 1 | 0 | 0 | 0 | 1 | 1 | 0 | 0 | 0 | 1 | 1 | 1 | 0 | 1 | 0 | 1 | 1 | 1 |
| 0 | 0 | 0 | 0 | 0 | 0 | 0 | 0 | 1 | 0 | 0 | 1 | 0 | 0 | 1 | 0 | 0 | 1 | 1 | 1 | 0 | 0 | 0 | 1 |
| 0 | 0 | 0 | 0 | 0 | 0 | 1 | 0 | 0 | 1 | 1 | 1 | 1 | 0 | 0 | 0 | 1 | 1 | 1 | 1 | 0 | 0 | 0 | 1 |
| 0 | 0 | 0 | 0 | 0 | 0 | 0 | 1 | 1 | 1 | 0 | 0 | 0 | 1 | 0 | 0 | 1 | 1 | 1 | 1 | 0 | 1 | 1 | 1 |
| 0 | 0 | 0 | 0 | 0 | 0 | 0 | 1 | 1 | 0 | 0 | 0 | 0 | 1 | 1 | 0 | 1 | 1 | 0 | 1 | 1 | 0 | 1 | 0 |
| 0 | 0 | 0 | 0 | 0 | 0 | 1 | 0 | 1 | 1 | 1 | 0 | 1 | 0 | 0 | 1 | 1 | 0 | 1 | 1 | 0 | 0 | 0 | 1 |
| 0 | 0 | 0 | 0 | 0 | 0 | 1 | 1 | 0 | 1 | 1 | 1 | 0 | 1 | 1 | 0 | 1 | 1 | 0 | 1 | 0 | 1 | 1 | 1 |
| 0 | 0 | 0 | 0 | 0 | 0 | 1 | 0 | 0 | 1 | 0 | 1 | 1 | 0 | 1 | 1 | 1 | 0 | 0 | 0 | 1 | 1 | 0 | 1 |
| 0 | 0 | 0 | 0 | 0 | 0 | 0 | 0 | 1 | 0 | 1 | 1 | 0 | 0 | 1 | 1 | 1 | 0 | 0 | 1 | 1 | 1 | 1 | 1 |
| 0 | 0 | 0 | 0 | 0 | 0 | 1 | 1 | 1 | 0 | 0 | 1 | 1 | 1 | 0 | 0 | 0 | 0 | 0 | 1 | 1 | 1 | 1 | 0 |
| 0 | 0 | 0 | 0 | 0 | 0 | 1 | 0 | 1 | 1 | 1 | 0 | 0 | 0 | 0 | 1 | 0 | 0 | 1 | 1 | 0 | 1 | 0 | 1 |
| 0 | 0 | 0 | 0 | 0 | 0 | 1 | 1 | 0 | 1 | 0 | 1 | 0 | 1 | 0 | 0 | 1 | 1 | 0 | 1 | 0 | 1 | 1 | 1 |
| 0 | 0 | 0 | 0 | 0 | 0 | 0 | 1 | 1 | 0 | 0 | 1 | 0 | 1 | 0 | 0 | 1 | 1 | 0 | 1 | 1 | 1 | 1 | 0 |
| 0 | 0 | 0 | 0 | 0 | 0 | 1 | 0 | 0 | 1 | 1 | 1 | 1 | 0 | 0 | 1 | 0 | 0 | 0 | 0 | 1 | 1 | 0 | 1 |
| 0 | 0 | 0 | 0 | 0 | 0 | 0 | 1 | 1 | 0 | 1 | 0 | 1 | 1 | 0 | 0 | 0 | 0 | 0 | 1 | 1 | 0 | 1 | 0 |
| 0 | 0 | 0 | 0 | 0 | 0 | 0 | 1 | 0 | 0 | 1 | 0 | 1 | 1 | 1 | 0 | 1 | 0 | 0 | 1 | 1 | 0 | 1 | 1 |

Some implementations include new sequence sets. Table 16, Table 17, Table 18, Table 19, Table 20, Table 21, Table 22, Table 23, and Table 24 may be used as DMRS sequences for length 6 with QPSK, length 6 with 8-PSK, length 6 with 12-PSK, length 12 with pi/2-BPSK, length 18 with pi/2-BPSK, and length 24 with pi/2-BPSK respectively.

In some examples, at least one of the values provided in the tables below may be used as a value of the phase parameter $\phi(n)$. In some examples, the phase modulated or rotated versions of the corresponding sequences in frequency may be utilized. The sequence sets may be utilized with OCC or frequency-shifting based user multiplexing methods for Type 1 mapping, for example, as given in FIG. 4 and FIG. 5.

Table 15 illustrates example performance of the example new sequence set.

TABLE 15

|  | Max PAPR [dB] | Max CM [dB] | Max Auto. corr | Max Auto. corr [−1, 1] | Max Auto. corr [−2, −1, 1, 2] | Max Auto. corr [−3, −2, −1, 1, 2, 3] | Max. Xcorr |
|---|---|---|---|---|---|---|---|
| Length 6 (pi/2 BPSK - auto-corr. first) | 1.5333 | −0.52497 | 0.33333 | 0 | 0.33333 | 0.33333 | 1 |
| Length 6 (pi/2 BPSK - cross-cor. first) | 1.5333 | −0.52497 | 0.66667 | 0.66667 | 0.66667 | 0.66667 | 1 |
| Length 6 (QPSK - auto. corr first) | 1.5333 | −0.52497 | 0.33333 | 0 | 0.33333 | 0.33333 | 1 |
| Length 6 (QPSK - cross-cor. first) | 2.2911 | 1.0351 | 0.74536 | 0.4714 | 0.74536 | 0.74536 | 0.92176 |
| Length 6 (8-PSK) | 2.0824 | 0.81064 | 0.80474 | 0.2357 | 0.4714 | 0.80474 | 0.9296 |
| Length 6 (12-PSK) | 1.9955 | 0.7356 | 0.68573 | 0.2357 | 0.68573 | 0.68573 | 0.91861 |
| Length 12 (π/2-BPSK) | 1.4931 | −0.60943 | 0.33333 | 0 | 0.33333 | 0.33333 | 0.83979 |
| Length 18 (π/2-BPSK) | 1.5408 | −0.71488 | 0.22222 | 0 | 0.11111 | 0.11111 | 0.68892 |
| Length 24 (π/2-BPSK) | 1.5853 | −0.71783 | 0.16667 | 0 | 0 | 0 | 0.66912 |

In some implementations, the indices for the final sequences in the set may be reordered, for example, based on row-wise reordering. In some implementations, the order of the elements of the sequences may be reversed. In some implementations, the modulated sequences may be reversed and/or conjugated. In some implementations, these operations do not change the properties of the sequence sets.

In some examples, for a sequence length of 6 having a modulation of π/2-BPSK which autocorrelation is prioritized; for example, where the sequences have very good autocorrelation, are above a threshold autocorrelation with acceptable cross correlation properties, and/or are above a threshold cross correlation, at least one of the values provided in the below table is used as a value of the phase parameter φ(n):

TABLE 16

| Sequence index u | Sequences φ$_u$(n) | | | | | |
|---|---|---|---|---|---|---|
| 1 | 0 | 0 | 0 | 1 | 0 | 0 |
| 2 | 0 | 1 | 1 | 0 | 1 | 1 |
| 3 | 1 | 1 | 0 | 0 | 0 | 1 |
| 4 | 1 | 0 | 1 | 1 | 1 | 1 |
| 5 | 0 | 0 | 1 | 0 | 0 | 0 |
| 6 | 1 | 1 | 0 | 1 | 1 | 1 |
| 7 | 1 | 0 | 0 | 0 | 0 | 0 |
| 8 | 0 | 0 | 0 | 1 | 1 | 1 |
| 9 | 1 | 1 | 0 | 1 | 0 | 1 |
| 10 | 0 | 0 | 1 | 0 | 0 | 1 |
| 11 | 1 | 0 | 0 | 0 | 1 | 0 |
| 12 | 0 | 1 | 0 | 1 | 0 | 0 |
| 13 | 0 | 0 | 0 | 1 | 0 | 1 |
| 14 | 1 | 0 | 1 | 0 | 0 | 0 |
| 15 | 1 | 1 | 1 | 1 | 1 | 0 |
| 16 | 0 | 0 | 1 | 0 | 1 | 0 |
| 17 | 0 | 0 | 1 | 1 | 1 | 0 |
| 18 | 0 | 0 | 0 | 0 | 0 | 1 |
| 19 | 0 | 1 | 1 | 1 | 0 | 1 |
| 20 | 1 | 1 | 0 | 0 | 0 | 1 |
| 21 | 1 | 1 | 1 | 0 | 0 | 0 |
| 22 | 1 | 1 | 1 | 0 | 1 | 1 |
| 23 | 0 | 1 | 0 | 0 | 0 | 0 |
| 24 | 0 | 1 | 1 | 1 | 1 | 1 |

TABLE 16-continued

| Sequence index u | Sequences φ$_u$(n) | | | | | |
|---|---|---|---|---|---|---|
| 25 | 0 | 1 | 1 | 1 | 0 | 0 |
| 26 | 0 | 1 | 0 | 0 | 1 | 0 |
| 27 | 1 | 1 | 1 | 1 | 0 | 1 |
| 28 | 1 | 0 | 1 | 0 | 1 | 1 |
| 29 | 0 | 0 | 0 | 0 | 1 | 0 |
| 30 | 1 | 0 | 0 | 0 | 1 | 1 |

The modulation symbols are generated with:

$$s_u(b_i) = \frac{e^{\frac{j\pi}{2}(i \bmod 2)}}{\sqrt{2}}[(1 - 2b_i) + j(1 - 2b_i)].$$

In some examples, if the sequence length is 6 (Modulation: π/2-BPSK—Cross correlation First—i.e., cross correlation is prioritized; e.g., where the sequences have very good cross correlation (e.g., above a threshold cross correlation) with acceptable autocorrelation properties (e.g., above a threshold autocorrelation)), at least one of the values provided in the below table is used as a value of the phase parameter φ(n):

TABLE 17

| Sequence index u | Sequences φ$_u$(n) | | | | | |
|---|---|---|---|---|---|---|
| 1 | 0 | 0 | 0 | 0 | 1 | 1 |
| 2 | 1 | 0 | 1 | 0 | 0 | 0 |
| 3 | 1 | 1 | 0 | 1 | 0 | 1 |
| 4 | 0 | 0 | 1 | 1 | 1 | 1 |
| 5 | 0 | 1 | 1 | 1 | 0 | 1 |
| 6 | 1 | 1 | 1 | 0 | 1 | 0 |
| 7 | 0 | 1 | 1 | 1 | 0 | 0 |
| 8 | 0 | 0 | 0 | 0 | 1 | 0 |
| 9 | 1 | 0 | 0 | 0 | 0 | 0 |
| 10 | 1 | 0 | 1 | 0 | 1 | 1 |
| 11 | 1 | 1 | 0 | 1 | 0 | 0 |
| 12 | 0 | 1 | 0 | 0 | 0 | 1 |

TABLE 17-continued

| Sequence index u | Sequences $\phi_u(n)$ | | | | | |
|---|---|---|---|---|---|---|
| 13 | 1 | 1 | 1 | 1 | 0 | 0 |
| 14 | 0 | 0 | 0 | 1 | 0 | 1 |
| 15 | 0 | 1 | 1 | 1 | 1 | 0 |
| 16 | 0 | 0 | 0 | 1 | 1 | 1 |
| 17 | 0 | 1 | 0 | 1 | 0 | 0 |
| 18 | 0 | 0 | 1 | 1 | 0 | 1 |
| 19 | 1 | 1 | 0 | 1 | 1 | 1 |
| 20 | 1 | 1 | 1 | 0 | 0 | 0 |
| 21 | 1 | 0 | 1 | 1 | 0 | 1 |
| 22 | 1 | 1 | 0 | 0 | 1 | 1 |
| 23 | 1 | 1 | 0 | 0 | 1 | 0 |
| 24 | 0 | 0 | 0 | 1 | 0 | 0 |
| 25 | 0 | 1 | 1 | 0 | 0 | 0 |
| 26 | 1 | 0 | 0 | 1 | 0 | 1 |
| 27 | 0 | 0 | 1 | 0 | 0 | 0 |
| 28 | 0 | 0 | 1 | 0 | 0 | 1 |
| 29 | 0 | 0 | 0 | 0 | 0 | 1 |
| 30 | 0 | 1 | 0 | 0 | 0 | 1 |

The modulation symbols are generated with:

$$s_u(b_i) = \frac{e^{\frac{j\pi}{2}(i \bmod 2)}}{\sqrt{2}}[(1-2b_i) + j(1-2b_i)].$$

In some examples, for a sequence length of 6 using QPSK modulation where autocorrelation is prioritized; for example, where the sequences have very good autocorrelation above a threshold autocorrelation with acceptable cross correlation properties, for example, above a threshold cross correlation, at least one of the values provided in the below table is used as a value of the phase parameter $\phi(n)$:

TABLE 18

| Sequence index u | Sequences $\phi_u(n)$ | | | | | |
|---|---|---|---|---|---|---|
| 1 | -3 | -1 | -3 | 3 | -3 | -1 |
| 2 | 1 | -1 | -3 | -1 | 1 | 3 |
| 3 | 1 | 3 | 1 | -1 | 1 | -1 |
| 4 | -3 | 3 | 1 | -1 | 1 | 3 |
| 5 | -1 | 1 | -1 | -3 | -1 | -3 |
| 6 | 3 | 1 | -1 | 1 | -1 | 1 |
| 7 | 3 | -3 | -1 | -3 | 3 | -3 |
| 8 | -1 | -3 | 3 | 1 | 3 | -3 |
| 9 | -3 | -1 | 1 | -1 | -3 | -1 |
| 10 | -1 | 1 | -1 | 1 | -1 | -3 |
| 11 | 3 | -3 | 3 | 1 | 1 | 1 |
| 12 | 1 | -1 | 1 | 3 | 1 | 3 |
| 13 | 1 | 3 | 1 | -1 | -3 | -1 |
| 14 | 3 | 1 | 3 | 1 | 3 | -3 |
| 15 | -1 | -3 | -1 | -3 | -1 | 1 |
| 16 | 3 | -3 | -1 | 1 | -1 | -3 |
| 17 | -3 | -1 | -3 | 3 | 1 | 3 |
| 18 | -1 | 1 | -1 | -3 | -1 | 1 |
| 19 | -3 | -1 | 1 | -1 | -3 | 3 |
| 20 | -1 | -3 | -1 | -3 | 3 | -3 |
| 21 | -3 | 3 | -3 | 3 | -3 | -1 |
| 22 | 1 | 3 | 1 | 3 | -3 | 3 |
| 23 | 1 | 3 | 1 | 3 | 1 | -1 |
| 24 | 1 | -1 | 1 | 3 | -3 | 3 |
| 25 | 1 | 3 | -3 | 3 | 1 | 3 |
| 26 | 1 | 3 | -3 | 3 | 1 | -1 |
| 27 | -3 | -1 | -3 | 3 | -3 | 3 |
| 28 | -1 | -3 | -1 | 1 | 3 | 1 |
| 29 | -1 | 1 | 3 | 1 | 3 | 1 |
| 30 | -3 | -1 | 1 | -1 | 1 | -1 |

The modulation symbols are generated with:

$$s_u(n) = e^{j\phi(n)\pi/4}.$$

In some examples, for a sequence length of 6 having QPSK modulation where cross correlation is prioritized; for example, where the sequences have very good cross correlation above a threshold cross correlation with acceptable autocorrelation properties, for example, above a threshold autocorrelation, at least one of the values provided in the below table is used as a value of the phase parameter $\phi(n)$:

TABLE 19

| Sequence index u | Sequences $\phi_u(n)$ | | | | | |
|---|---|---|---|---|---|---|
| 1 | -3 | -3 | -1 | -3 | -1 | 3 |
| 2 | -3 | -3 | 1 | -1 | 3 | 1 |
| 3 | -3 | -1 | -3 | 1 | 3 | -1 |
| 4 | -3 | -1 | -3 | 1 | -1 | 3 |
| 5 | -3 | -3 | -1 | 1 | -1 | 1 |
| 6 | -3 | -1 | -3 | 3 | 1 | 3 |
| 7 | -3 | -3 | 1 | 3 | 1 | 3 |
| 8 | -3 | -3 | -1 | 1 | -3 | 1 |
| 9 | -3 | -1 | -3 | 3 | -3 | 1 |
| 10 | -3 | -3 | -1 | 3 | -3 | -1 |
| 11 | -3 | -3 | 3 | -3 | -1 | 3 |
| 12 | -3 | -3 | 1 | -3 | 1 | 3 |
| 13 | -3 | -3 | -1 | 1 | -3 | -1 |
| 14 | -3 | -1 | -3 | -1 | -3 | 3 |
| 15 | -3 | -3 | -1 | 3 | -3 | 1 |
| 16 | -3 | -3 | -1 | 3 | -3 | 3 |
| 17 | -3 | -3 | -3 | 1 | -3 | 1 |
| 18 | -3 | -3 | 1 | 3 | -1 | 1 |
| 19 | -3 | -3 | 1 | -3 | -1 | 3 |
| 20 | -3 | -1 | 1 | -3 | 3 | -1 |
| 21 | -3 | -1 | 3 | -3 | 1 | -1 |
| 22 | -3 | -3 | -1 | 3 | -1 | 1 |
| 23 | -3 | -3 | 1 | 3 | -1 | 3 |
| 24 | -3 | -3 | 1 | 3 | -3 | 3 |
| 25 | -3 | -3 | 1 | -3 | 1 | 1 |
| 26 | -3 | -1 | -3 | -1 | 1 | -1 |
| 27 | -3 | -3 | -1 | -3 | -1 | 1 |
| 28 | -3 | -3 | 3 | -3 | 1 | 3 |
| 29 | -3 | -1 | -3 | -1 | 3 | 1 |
| 30 | -3 | -3 | 1 | -1 | 3 | -1 |

The modulation symbols are generated with:

$$s_u(n) = e^{j\phi(n)\pi/4}.$$

In some examples, for a sequence length of 6 (Modulation: 8-PSK), at least one of the values provided in Table 20 is used as a value of the phase parameter $\phi(n)$:

TABLE 20

| Sequence index u | Sequences $\phi_u(n)$ | | | | | |
|---|---|---|---|---|---|---|
| 1 | -7 | -3 | -5 | 5 | 1 | 5 |
| 2 | -7 | -3 | -7 | 3 | -7 | 5 |
| 3 | -7 | -5 | -1 | 7 | 3 | -3 |
| 4 | -7 | -3 | -7 | 7 | -5 | -1 |
| 5 | -7 | -7 | -1 | 5 | 5 | -1 |
| 6 | -7 | -5 | 5 | 1 | 7 | -5 |
| 7 | -7 | -5 | 5 | 3 | -3 | 3 |
| 8 | -7 | -5 | 7 | -3 | 3 | 1 |
| 9 | -7 | -5 | 5 | 3 | -7 | -1 |
| 10 | -7 | -7 | 3 | 5 | 1 | 5 |
| 11 | -7 | -5 | 3 | 7 | 5 | -1 |
| 12 | -7 | -3 | 3 | -1 | -5 | -1 |
| 13 | -7 | -5 | 7 | 3 | 1 | 5 |
| 14 | -7 | -5 | -1 | -3 | -7 | 5 |
| 15 | -7 | -3 | -7 | -1 | -7 | 5 |
| 16 | -7 | -5 | 1 | 7 | 1 | -1 |
| 17 | -7 | -5 | -7 | 3 | -7 | -1 |
| 18 | -7 | -5 | 1 | -5 | -7 | 3 |

TABLE 20-continued

| Sequence index u | Sequences φ_u(n) | | | | | |
|---|---|---|---|---|---|---|
| 19 | −7 | −5 | 1 | 7 | 1 | −5 |
| 20 | −7 | −5 | 5 | −1 | 5 | 3 |
| 21 | −7 | −7 | −3 | 1 | −3 | 7 |
| 22 | −7 | −3 | −7 | −3 | −5 | 5 |
| 23 | −7 | −5 | 3 | −1 | 5 | −5 |
| 24 | −7 | −3 | −7 | −1 | 3 | 1 |
| 25 | −7 | −3 | 3 | −1 | 3 | −5 |
| 26 | −7 | −5 | 1 | −5 | 5 | 3 |
| 27 | −7 | −5 | 5 | −1 | −3 | 1 |
| 28 | −7 | −5 | −7 | 3 | −3 | 3 |
| 29 | −7 | −5 | 1 | −1 | 5 | −1 |
| 30 | −7 | −5 | −7 | −1 | 5 | −1 |

In this example, the modulation symbols are generated with:

$$s_u(n) = e^{j\phi(n)\pi/8}.$$

In some examples, for a sequence length of 6 (Modulation: 12-PSK), at least one of the values provided in Table 21 is used as a value of the phase parameter $\phi_u(n)$:

TABLE 21

| Sequence index u | Sequences φ_u(n) | | | | | |
|---|---|---|---|---|---|---|
| 1 | −11 | −7 | −11 | −5 | 9 | 1 |
| 2 | −11 | −5 | −11 | 9 | −7 | −1 |
| 3 | −11 | −7 | −1 | 5 | −1 | −9 |
| 4 | −11 | −7 | 9 | −7 | 1 | −5 |
| 5 | −11 | −7 | 1 | −9 | 7 | −9 |
| 6 | −11 | −5 | −11 | −5 | 3 | −7 |
| 7 | −11 | −7 | −11 | 3 | −5 | 7 |
| 8 | −11 | −7 | 1 | −3 | 5 | −1 |
| 9 | −11 | −9 | −1 | −7 | 7 | 3 |
| 10 | −11 | −11 | −7 | 7 | −1 | 5 |
| 11 | −11 | −7 | −1 | −11 | 9 | 1 |
| 12 | −11 | −9 | 5 | 1 | 11 | −5 |
| 13 | −11 | −7 | 3 | −3 | 9 | −7 |
| 14 | −11 | −7 | 3 | 9 | 5 | −3 |
| 15 | −11 | −7 | −1 | 11 | 3 | −7 |
| 16 | −11 | −7 | −9 | 5 | −11 | 5 |
| 17 | −11 | −7 | 1 | −5 | 3 | −7 |
| 18 | −11 | −7 | 11 | −5 | 3 | 1 |
| 19 | −11 | −11 | 3 | 7 | −1 | 5 |
| 20 | −11 | −7 | 9 | 1 | −3 | 3 |
| 21 | −11 | −11 | −3 | 3 | −5 | −1 |
| 22 | −11 | −11 | −3 | 3 | −5 | 9 |
| 23 | −11 | −5 | −11 | −5 | −9 | 5 |
| 24 | −11 | −5 | −11 | −5 | 9 | −9 |
| 25 | −11 | −7 | 1 | 9 | 1 | −1 |
| 26 | −11 | −11 | −3 | 5 | 5 | −3 |
| 27 | −11 | −5 | −7 | 11 | −7 | 7 |
| 28 | −11 | −5 | −11 | −5 | −7 | −1 |
| 29 | −11 | −11 | 5 | 9 | −9 | −3 |
| 30 | −11 | −11 | 5 | −11 | −3 | −1 |

In some examples, if the sequence length is 12 (Modulation: π/2-BPSK), at least one of the values provided in Table 22 is used as a value of the phase parameter $\phi_u(n)$:

TABLE 22

| Sequence index u | Sequences φ_u(n) | | | | | | | | | | | |
|---|---|---|---|---|---|---|---|---|---|---|---|---|
| 1 | 0 | 0 | 0 | 0 | 0 | 0 | 0 | 1 | 0 | 0 | 1 | 0 |
| 2 | 0 | 0 | 0 | 0 | 1 | 1 | 1 | 0 | 0 | 1 | 1 | 1 |
| 3 | 0 | 0 | 0 | 0 | 0 | 1 | 0 | 1 | 0 | 0 | 1 | 0 |
| 4 | 0 | 0 | 0 | 0 | 1 | 0 | 0 | 0 | 1 | 1 | 1 | 0 |
| 5 | 0 | 0 | 0 | 0 | 1 | 0 | 0 | 0 | 0 | 1 | 1 | 1 |
| 6 | 0 | 0 | 0 | 0 | 0 | 0 | 0 | 1 | 1 | 1 | 0 | 1 |
| 7 | 0 | 0 | 0 | 0 | 1 | 0 | 0 | 1 | 1 | 1 | 1 | 1 |
| 8 | 0 | 0 | 0 | 1 | 0 | 1 | 1 | 0 | 0 | 0 | 1 | 1 |
| 9 | 0 | 0 | 0 | 0 | 0 | 1 | 1 | 0 | 1 | 0 | 1 | 1 |
| 10 | 0 | 0 | 0 | 0 | 0 | 0 | 0 | 1 | 1 | 0 | 1 | 1 |
| 11 | 0 | 0 | 0 | 0 | 1 | 0 | 0 | 1 | 0 | 1 | 1 | 1 |
| 12 | 0 | 0 | 0 | 0 | 0 | 0 | 1 | 0 | 0 | 1 | 1 | 1 |
| 13 | 0 | 0 | 0 | 0 | 0 | 1 | 0 | 0 | 1 | 0 | 1 | 0 |
| 14 | 0 | 0 | 0 | 1 | 0 | 0 | 0 | 1 | 0 | 1 | 1 | 1 |
| 15 | 0 | 0 | 0 | 0 | 0 | 0 | 0 | 1 | 0 | 1 | 1 | 1 |
| 16 | 0 | 0 | 0 | 0 | 0 | 1 | 1 | 1 | 0 | 0 | 1 | 0 |
| 17 | 0 | 0 | 0 | 0 | 1 | 1 | 0 | 1 | 1 | 1 | 1 | 0 |
| 18 | 0 | 0 | 0 | 0 | 0 | 0 | 1 | 0 | 1 | 1 | 1 | 0 |
| 19 | 0 | 0 | 0 | 0 | 0 | 1 | 1 | 0 | 1 | 1 | 1 | 0 |
| 20 | 0 | 0 | 0 | 0 | 0 | 0 | 1 | 0 | 1 | 1 | 1 | 1 |
| 21 | 0 | 0 | 0 | 0 | 0 | 0 | 1 | 1 | 1 | 0 | 1 | 0 |
| 22 | 0 | 0 | 0 | 1 | 1 | 1 | 0 | 0 | 1 | 1 | 1 | 0 |
| 23 | 0 | 0 | 0 | 0 | 1 | 1 | 0 | 1 | 1 | 0 | 0 | 1 |
| 24 | 0 | 0 | 0 | 0 | 0 | 1 | 1 | 1 | 0 | 0 | 0 | 1 |
| 25 | 0 | 0 | 0 | 0 | 1 | 1 | 0 | 0 | 0 | 1 | 1 | 1 |
| 26 | 0 | 0 | 0 | 0 | 1 | 0 | 1 | 1 | 0 | 1 | 1 | 1 |
| 27 | 0 | 0 | 0 | 0 | 1 | 0 | 0 | 0 | 1 | 1 | 1 | 0 |
| 28 | 0 | 0 | 0 | 0 | 1 | 1 | 1 | 0 | 1 | 1 | 1 | 0 |
| 29 | 0 | 0 | 0 | 1 | 0 | 0 | 0 | 1 | 0 | 0 | 1 | 0 |
| 30 | 0 | 0 | 0 | 1 | 0 | 0 | 1 | 1 | 0 | 1 | 1 | 0 |

In this example, the modulation symbols are generated with $$s_u(\phi_u(i)) = \frac{e^{\frac{j\pi}{2}(i \bmod 2)}}{\sqrt{2}}[(1 - 2\phi_u(i)) + j(1 - 2\phi_u(i))].$$

In some examples, one or more sequences from the sequence set which includes the sequence indices of 9, 10, 19, and 11 in Table 22 may be particularly utilized as DMRS and combined with other sequences.

In some examples, one or more sequences from the sequence set which includes the sequence indices of 9, 10, 19, 11, 27, 28, 4, 5 in Table 22 may be particularly utilized as DMRS and combined with other sequences.

In some examples, if the sequence length is 18 (Modulation: π/2-BPSK), at least one of the values provided in Table 23 is used as a value of the phase parameter $\phi_u(n)$:

TABLE 23

| Sequence index u | Sequences φ_u(n) | | | | | | | | | | | | | | | | | |
|---|---|---|---|---|---|---|---|---|---|---|---|---|---|---|---|---|---|---|
| 1 | 0 | 0 | 0 | 0 | 1 | 0 | 0 | 0 | 1 | 0 | 0 | 0 | 1 | 1 | 0 | 1 | 1 | |
| 2 | 0 | 0 | 0 | 0 | 0 | 1 | 0 | 0 | 1 | 0 | 0 | 1 | 1 | 1 | 1 | 1 | 0 | |
| 3 | 0 | 0 | 0 | 0 | 1 | 0 | 0 | 1 | 0 | 0 | 0 | 0 | 1 | 1 | 1 | 1 | 1 | |
| 4 | 0 | 0 | 0 | 0 | 0 | 1 | 0 | 1 | 0 | 0 | 0 | 1 | 1 | 0 | 1 | 1 | 1 | |
| 5 | 0 | 0 | 0 | 0 | 0 | 1 | 1 | 1 | 0 | 0 | 1 | 0 | 0 | 0 | 1 | 0 | 0 | 1 |

TABLE 23-continued

| Sequence index u | Sequences $\phi_u(n)$ |
|---|---|
| 6  | 0 0 0 0 0 1 1 1 0 0 1 1 1 1 0 1 1 0 |
| 7  | 0 0 0 0 0 0 0 1 1 1 1 1 0 0 1 0 0 1 |
| 8  | 0 0 0 0 0 1 0 0 0 1 1 1 1 1 0 0 0 1 |
| 9  | 0 0 0 0 1 1 0 1 1 1 0 1 1 1 1 0 0 1 |
| 10 | 0 0 0 0 1 1 1 0 0 1 0 0 1 0 0 0 1 0 |
| 11 | 0 0 0 0 1 0 0 0 1 1 0 1 1 0 1 1 1 0 |
| 12 | 0 0 0 0 1 0 0 1 1 1 0 0 0 1 0 1 1 1 |
| 13 | 0 0 0 0 0 0 0 1 1 0 1 0 1 1 0 0 0 1 |
| 14 | 0 0 0 0 0 1 0 1 0 0 0 0 0 1 1 0 1 1 |
| 15 | 0 0 0 0 1 0 0 0 1 1 0 1 1 0 1 0 0 1 |
| 16 | 0 0 0 0 0 0 0 1 0 0 1 1 1 0 0 1 0 1 |
| 17 | 0 0 0 0 0 0 0 1 1 0 0 0 1 1 1 0 1 1 |
| 18 | 0 0 0 0 0 1 1 1 0 1 1 1 0 0 0 1 1 1 |
| 19 | 0 0 0 0 0 0 1 0 0 0 1 1 0 1 0 1 1 0 |
| 20 | 0 0 0 0 0 0 1 1 0 0 1 1 1 1 0 0 0 1 |
| 21 | 0 0 0 0 1 0 0 1 1 1 1 0 1 1 1 0 1 1 |
| 22 | 0 0 0 0 0 1 1 1 1 0 1 1 1 0 1 1 1 1 |
| 23 | 0 0 0 0 0 0 0 1 0 0 1 0 0 1 1 1 1 1 |
| 24 | 0 0 0 0 1 0 0 1 0 0 0 0 1 1 1 0 1 0 |
| 25 | 0 0 0 0 1 1 1 0 1 1 1 0 0 1 0 0 1 0 |
| 26 | 0 0 0 0 0 1 1 0 1 1 1 0 0 0 0 0 1 1 |
| 27 | 0 0 0 0 1 0 0 1 0 1 1 1 0 0 0 1 0 1 |
| 28 | 0 0 0 0 0 0 1 0 1 1 0 0 0 1 0 1 1 0 |
| 29 | 0 0 0 0 0 1 1 1 0 1 0 0 1 1 0 1 1 0 |
| 30 | 0 0 0 0 1 1 0 1 1 0 0 0 1 0 0 0 0 1 |

In this example, the modulation symbols are generated with $$s_u(\phi_u(i)) = \frac{e^{j\frac{\pi}{2}(i \bmod 2)}}{\sqrt{2}}[(1 - 2\phi_u(i)) + j(1 - 2\phi_u(i))].$$

In some examples, one or more sequences from the sequence set which includes the sequence indices of 18, 22, 3, 8, 14, 2, 7, and 29 in Table 23 may be particularly utilized as DMRS and combined with other sequences.

In some examples, one or more sequences from the sequence set which includes the sequence indices of 18, 22, 3, and 8 in Table 23 may be particularly utilized as DMRS and combined with other sequences.

In some examples, if the sequence length is 24 (Modulation: π/2-BPSK), at least one of the values provided in Table 24 is used as a value of the phase parameter $\phi_u(n)$:

TABLE 24

| Sequence index u | Sequences $\phi_u(n)$ |
|---|---|
| 1  | 0 0 0 0 0 0 0 0 1 0 1 1 0 0 1 1 1 0 0 1 1 1 1 0 |
| 2  | 0 0 0 0 0 0 0 0 1 1 1 0 0 1 1 0 1 1 0 0 1 0 1 0 |
| 3  | 0 0 0 0 0 0 0 1 1 1 1 0 1 0 1 0 0 1 1 0 0 0 1 1 |
| 4  | 0 0 0 0 0 0 1 0 1 1 0 0 1 1 1 0 0 0 1 1 0 1 |
| 5  | 0 0 0 0 0 0 1 0 0 1 1 1 1 0 1 1 0 0 1 0 1 1 1 |
| 6  | 0 0 0 0 0 0 1 0 0 1 1 1 1 1 0 0 1 0 0 1 0 0 1 |
| 7  | 0 0 0 0 0 0 0 1 0 0 1 1 1 1 0 0 1 1 1 0 1 0 0 1 |
| 8  | 0 0 0 0 0 0 0 1 1 1 0 1 1 0 0 1 0 1 0 0 1 1 0 |
| 9  | 0 0 0 0 0 0 0 1 1 1 0 1 0 0 1 1 0 1 1 1 0 1 1 |
| 10 | 0 0 0 0 0 0 0 1 0 0 1 0 1 1 0 0 0 1 1 1 1 0 0 1 |
| 11 | 0 0 0 0 0 0 0 1 1 0 1 1 0 1 1 0 0 0 0 0 1 1 0 |
| 12 | 0 0 0 0 0 0 0 1 0 1 1 0 0 0 1 0 1 1 0 0 1 1 1 1 |
| 13 | 0 0 0 0 0 0 0 1 0 0 1 0 0 0 1 1 0 1 0 0 0 1 1 |
| 14 | 0 0 0 0 0 0 0 1 0 0 0 1 1 0 0 0 1 0 0 1 0 1 1 |
| 15 | 0 0 0 0 0 0 0 1 0 0 1 0 1 0 1 1 0 0 0 1 0 1 1 |
| 16 | 0 0 0 0 0 0 0 1 1 0 0 1 0 1 0 0 1 1 0 1 1 1 0 |
| 17 | 0 0 0 0 0 0 0 1 0 0 1 1 0 1 1 0 1 0 0 1 1 0 1 |
| 18 | 0 0 0 0 0 0 1 0 1 0 0 1 0 0 1 0 0 1 0 0 1 1 1 |
| 19 | 0 0 0 0 0 0 0 1 1 1 0 0 1 1 1 0 0 0 0 1 1 1 |
| 20 | 0 0 0 0 0 0 0 1 0 0 1 1 0 1 1 1 0 0 0 1 1 1 1 |
| 21 | 0 0 0 0 0 0 0 0 1 1 0 0 1 0 1 0 0 1 1 0 1 0 1 |
| 22 | 0 0 0 0 0 0 0 1 0 0 0 0 0 1 1 0 1 1 0 1 1 0 |
| 23 | 0 0 0 0 0 0 0 1 1 0 1 1 0 0 1 0 1 0 1 1 0 1 1 |
| 24 | 0 0 0 0 0 0 1 0 0 0 0 1 1 0 1 0 1 1 1 1 0 1 0 |
| 25 | 0 0 0 0 0 0 0 0 0 1 0 1 0 0 1 1 0 1 1 0 0 1 1 1 |
| 26 | 0 0 0 0 0 0 0 1 1 0 0 0 1 1 1 1 0 0 1 1 1 1 1 |
| 27 | 0 0 0 0 0 0 0 1 0 1 0 1 0 1 0 0 1 1 1 1 0 1 1 |
| 28 | 0 0 0 0 0 0 0 1 1 0 1 1 0 1 1 0 0 1 1 0 1 1 1 |
| 29 | 0 0 0 0 0 0 0 1 0 0 1 0 1 0 1 1 1 0 0 0 1 1 0 |
| 30 | 0 0 0 0 0 0 0 1 0 0 1 0 0 1 0 1 1 1 1 0 1 1 0 |

In this example, the modulation symbols are generated with $$s_u(\phi_u(i)) = \frac{e^{\frac{j\pi}{2}(i \bmod 2)}}{\sqrt{2}}[(1 - 2\phi_u(i)) + j(1 - 2\phi_u(i))].$$

In some examples, one or more sequences from the sequence set which includes the sequence indices of 29, 6, 27, 28, 23, 11, 22, and 12 in Table 24 may be particularly utilized as DMRS and combined with other sequences.

In some examples, one or more sequences from the sequence set which includes the sequence indices of 29, 6, 27, and 28 in Table 24 may be particularly utilized as DMRS and combined with other sequences.

Some implementations include user multiplexing.

Figure 5:
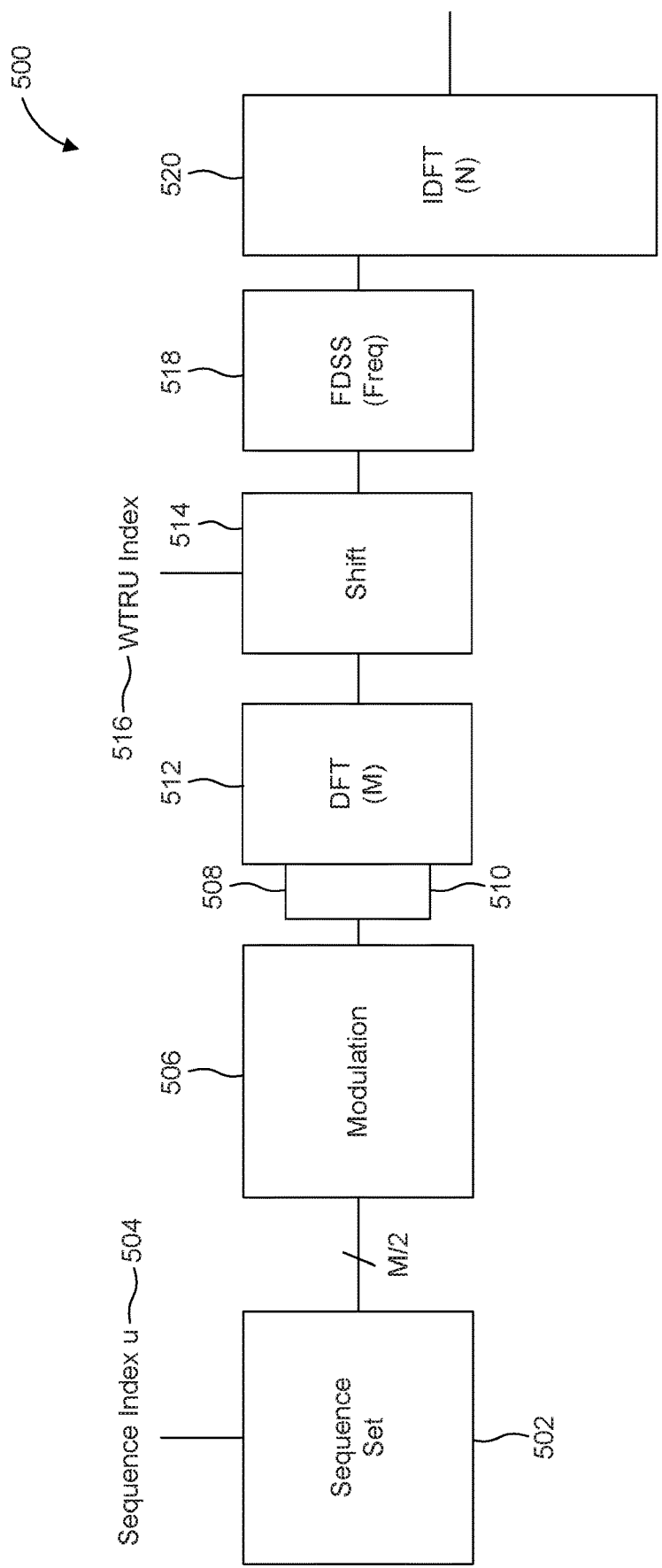
FIG. 5 is a block diagram illustrating an example transmitter for generating DMRS signals without losing properties of the sequence set.

FIG. 5 is a block diagram illustrating an example of user multiplexing, including an example transmitter 500 for generating DMRS signals without losing properties of the sequence set. In this example, in the first block, a sequence may be determined from a sequence set 502 based on a sequence index u 504. In the second block, the chosen sequence may be modulated 506 with a modulation type, e.g., π/2-BPSK. The resulting output may be repeated twice 508, 510. Thereafter, the repeated sequence may be precoded by a DFT precoder 512 in the third block, and the output of the DFT may be shifted 514 by a WTRU index 516, OCC index or other index, in the fourth block to enable Type 1 mapping The sequence is then processed with FDSS 518 in the fifth block. An IDFT 520 is calculated in the sixth block and the resulting vector may be transmitted. In some implementations, this approach does not change the properties of the sequence set; for example, cross correlation properties, PAPR, CM, and/or autocorrelation properties. In some examples, the sequences may be cyclically shifted before the DFT operation to enable multiple orthogonal DMRS ports. In some examples, phase rotations or modulation operation, i.e., $s \cdot * e^{j2\pi/Mnk}$ where $n, k \in \{0, 1, \ldots M-1\}$ and s may be the sequence that is repeated or the repeated sequence before IDFT operation. In some examples, the same operation may be used to shift sequence in frequency.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
   a processor configured to determine a sequence, from a set of sequences comprising 0 0 0 0 0 0 1 1 0 1 1 0, 0 0 0 0 0 1 0 0 0 1 1 1 and 0 0 0 0 0 1 1 1 0 1 1 1; and
   a transmitter configured to transmit a demodulation reference signal (DMRS) derived from the determined sequence.

2. The WTRU of claim 1, wherein the determined sequence is 0 0 0 0 0 0 1 1 0 1 1 0.

3. The WTRU of claim 1, wherein the determined sequence is 0 0 0 0 0 1 0 0 0 1 1 1.

4. The WTRU of claim 1, wherein the determined sequence is 0 0 0 0 0 1 1 1 0 1 1 1.

5. The WTRU of claim 1, wherein the DMRS is a reference signal corresponding to an uplink shared channel.

6. A wireless transmit/receive unit (WTRU) comprising:
   a processor configured to determine a sequence, from a set of sequences comprising: 0 0 0 0 0 0 0 1 1 1 1 1 0 0 1 0 0 1, 0 0 0 0 0 1 0 0 0 1 1 1 1 1 0 0 0 1 and 0 0 0 0 0 1 1 1 1 0 1 1 1 0 1 1 1 1; and
   a transmitter configured to transmit a demodulation reference signal (DMRS) derived from the determined sequence.

7. The WTRU of claim 6, wherein the determined sequence is 0 0 0 0 0 0 0 1 1 1 1 1 0 0 1 0 0 1.

8. The WTRU of claim 6, wherein the determined sequence is 0 0 0 0 0 1 0 0 0 1 1 1 1 1 0 0 0 1.

9. The WTRU of claim 6, wherein the determined sequence is 0 0 0 0 0 1 1 1 1 0 1 1 1 0 1 1 1 1.

10. The WTRU of claim 6, wherein the DMRS is a reference signal corresponding to an uplink shared channel.

11. A wireless transmit/receive unit (WTRU) comprising:
    a processor configured to determine a sequence, from a set of sequences comprising: 0 0 0 0 0 0 0 1 0 0 1 1 1 1 1 0 0 1 0 0 1 0 0 1, 0 0 0 0 0 0 0 0 1 1 0 1 1 0 0 1 0 1 0 1 1 0 1 1, 0 0 0 0 0 0 0 0 1 0 0 1 0 0 1 1 1 1 0 1 1 and 0 0 0 0 0 0 0 1 0 0 1 0 1 1 0 1 1 1 0 0 0 1 1 0; and
    a transmitter configured to transmit a demodulation reference signal (DMRS); derived from the determined sequence.

12. The WTRU of claim 11, wherein the determined sequence is 0 0 0 0 0 0 0 1 0 0 1 1 1 1 1 0 0 1 0 0 1 0 0 1.

13. The WTRU of claim 11, wherein the determined sequence is 0 0 0 0 0 0 0 0 1 1 0 1 1 0 0 1 0 1 0 1 1 0 1 1.

14. The WTRU of claim 11, wherein the determined sequence is 0 0 0 0 0 0 0 0 1 0 0 1 0 0 1 1 1 1 0 1 1.

15. The WTRU of claim 11, wherein the determined sequence is 0 0 0 0 0 0 0 0 1 0 0 1 0 0 1 1 1 1 0 1 1 0 0 0 0 0 0 0 1 0 0 1 0 1 1 0 1 1 1 0 0 0 1 1 0.

16. The WTRU of claim 11, wherein the DMRS is a reference signal corresponding to an uplink shared channel.

* * * * *